US010891960B2

(12) United States Patent
Chebiyyam et al.

(10) Patent No.: US 10,891,960 B2
(45) **Date of Patent: *Jan. 12, 2021**

(54) TEMPORAL OFFSET ESTIMATION

(71) Applicant: QUALCOMM Incorporated, San Diego, CA (US)

(72) Inventors: Venkata Subrahmanyam Chandra Sekhar Chebiyyam, Santa Clara, CA (US); Venkatraman Atti, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 16/115,129

(22) Filed: Aug. 28, 2018

(65) Prior Publication Data

US 2019/0080703 A1 Mar. 14, 2019

Related U.S. Application Data

(60) Provisional application No. 62/556,653, filed on Sep. 11, 2017.

(51) Int. Cl.
*G10L 15/22* (2006.01)
*G10L 19/008* (2013.01)
(Continued)

(52) U.S. Cl.
CPC .......... *G10L 19/008* (2013.01); *G10L 19/005* (2013.01); *G10L 19/022* (2013.01);
(Continued)

(58) Field of Classification Search
None
See application file for complete search history.

(56) References Cited

U.S. PATENT DOCUMENTS

| | | | | |
|---|---|---|---|---|
| 6,539,357 B1 * | 3/2003 | Sinha | G10L 19/008 | 704/205 |
| 7,502,743 B2 * | 3/2009 | Thumpudi | G10L 19/008 | 704/500 |

(Continued)

OTHER PUBLICATIONS

International Search Report and Written Opinion—PCT/US2018/050242—ISA/EPO—dated Nov. 7, 2018.

*Primary Examiner* — Neeraj Sharma
(74) *Attorney, Agent, or Firm* — Moore IP

(57) ABSTRACT

A method of coding for multi-channel audio signals includes estimating comparison values at an encoder indicative of an amount of temporal mismatch between a reference channel and a corresponding target channel. The method includes smoothing the comparison values to generate short-term and first long-term smoothed comparison values. The method includes calculating a cross-correlation value between the comparison values and the short-term smoothed comparison values. The method also includes adjusting the first long-term smoothed comparison values in response to comparing the cross-correlation value with a threshold. The method further includes estimating a tentative shift value and non-causally shifting the target channel by a non-causal shift value to generate an adjusted target channel. The non-causal shift value is based on the tentative shift value. The method further includes generating, based on reference channel and the adjusted target channel, at least one of a mid-band channel or a side-band channel.

52 Claims, 14 Drawing Sheets

(51) Int. Cl.

| | |
|---|---|
| ***G10L 19/005*** | (2013.01) |
| ***G10L 19/022*** | (2013.01) |
| ***H04S 3/00*** | (2006.01) |
| *H04S 7/00* | (2006.01) |
| *H04S 1/00* | (2006.01) |
| *H04R 27/00* | (2006.01) |

(52) U.S. Cl.

CPC .............. *H04S 3/008* (2013.01); *H04R 27/00* (2013.01); *H04R 2227/003* (2013.01); *H04S 1/007* (2013.01); *H04S 7/305* (2013.01); *H04S 2400/01* (2013.01); *H04S 2400/03* (2013.01); *H04S 2400/15* (2013.01); *H04S 2420/03* (2013.01)

(56) References Cited

U.S. PATENT DOCUMENTS

| | | | | |
|---|---|---|---|---|
| 9,361,896 | B2 * | 6/2016 | Disch | G10L 19/008 |
| 9,449,604 | B2 * | 9/2016 | Virette | G10L 19/008 |
| 10,304,468 | B2 | 5/2019 | Atti et al. | |
| 2005/0216262 | A1 * | 9/2005 | Fejzo | G10L 19/0017 704/217 |
| 2007/0067166 | A1 * | 3/2007 | Pan | G10L 19/0216 704/222 |
| 2007/0162278 | A1 * | 7/2007 | Miyasaka | G10L 19/008 704/201 |
| 2008/0002842 | A1 * | 1/2008 | Neusinger | H04S 3/008 381/119 |
| 2009/0326962 | A1 * | 12/2009 | Chen | G10L 19/002 704/500 |
| 2010/0073572 | A1 * | 3/2010 | Burns | H04B 1/109 348/707 |
| 2012/0053714 | A1 | 3/2012 | Wu et al. | |
| 2012/0314776 | A1 * | 12/2012 | Shimizu | H04N 19/597 375/240.25 |
| 2015/0332680 | A1 * | 11/2015 | Crockett | G10L 25/18 381/23 |
| 2017/0116997 | A1 | 4/2017 | Gibbs et al. | |
| 2017/0180906 | A1 | 6/2017 | Chebiyyam | |
| 2018/0233154 | A1 * | 8/2018 | Vaillancourt | G10L 19/24 |

* cited by examiner

TEMPORAL OFFSET ESTIMATION

I. CROSS REFERENCE TO RELATED APPLICATIONS

The present application claims priority from U.S. Provisional Patent Application No. 62/556,653 entitled "TEMPORAL OFFSET ESTIMATION," filed Sep. 11, 2017, which is incorporated herein by reference in its entirety.

II. FIELD

The present disclosure is generally related to estimating a temporal offset of multiple channels.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A computing device may include multiple microphones to receive audio signals. Generally, a sound source is closer to a first microphone than to a second microphone of the multiple microphones. Accordingly, a second audio signal received from the second microphone may be delayed relative to a first audio signal received from the first microphone. In stereo-encoding, audio signals from the microphones may be encoded to generate a mid channel and one or more side channels. The mid channel may correspond to a sum of the first audio signal and the second audio signal. A side channel may correspond to a difference between the first audio signal and the second audio signal. The first audio signal may not be temporally aligned with the second audio signal because of the delay in receiving the second audio signal relative to the first audio signal. The misalignment (or "temporal offset") of the first audio signal relative to the second audio signal may increase a magnitude of the side channel. Because of the increase in magnitude of the side channel, a greater number of bits may be needed to encode the side channel.

Additionally, different frame types may cause the computing device to generate different temporal offsets or shift estimates. For example, the computing device may determine that a voiced frame of the first audio signal is offset by a corresponding voiced frame in the second audio signal by a particular amount. However, due to a relatively high amount of noise, the computing device may determine that a transition frame (or unvoiced frame) of the first audio signal is offset by a corresponding transition frame (or corresponding unvoiced frame) of the second audio signal by a different amount. Variations in the shift estimates may cause sample repetition and artifact skipping at frame boundaries. Additionally, variation in shift estimates may result in higher side channel energies, which may reduce coding efficiency.

IV. SUMMARY

According to one implementation of the techniques disclosed herein, a method of estimating a temporal offset between audio captured at multiple microphones includes capturing a reference channel at a first microphone and capturing a target channel at a second microphone. The reference channel includes a reference frame, and the target channel includes a target frame. The method also includes estimating a delay between the reference frame and the target frame. The method further includes estimating a temporal offset between the reference channel and the target channel based on a cross-correlation values of comparison values.

According to another implementation of the techniques disclosed herein, an apparatus for estimating a temporal offset between audio captured at multiple microphones includes a first microphone configured to capture a reference channel and a second microphone configured to capture a target channel. The reference channel includes a reference frame, and the target channel includes a target frame. The apparatus also includes a processor and a memory storing instructions that are executable to cause the processor to estimate a delay between the reference frame and the target frame. The instructions are also executable to cause the processor to estimate a temporal offset between the reference channel and the target channel based on a cross-correlation values of comparison values.

According to another implementation of the techniques disclosed herein, a non-transitory computer-readable medium includes instructions for estimating a temporal offset between audio captured at multiple microphones. The instructions, when executed by a processor, cause the processor to perform operations including estimating a delay between a reference frame and a target frame. The reference frame is included in a reference channel captured at a first microphone, and the target frame is included in a target channel captured at a second microphone. The operations also include estimating a temporal offset between the reference channel and the target channel based on a cross-correlation values of comparison values.

According to another implementation of the techniques disclosed herein, an apparatus for estimating a temporal offset between audio captured at multiple microphones includes means for capturing a reference channel and means for capturing a target channel. The reference channel includes a reference frame, and the target channel includes a target frame. The apparatus also includes means for estimating a delay between the reference frame and the target frame. The apparatus further includes means for estimating a temporal offset between the reference channel and the target channel based on a cross-correlation values of comparison values.

According to another implementation of the techniques disclosed herein, a method of non-causally shifting a channel includes estimating comparison values at an encoder. Each comparison value is indicative of an amount of temporal mismatch between a previously captured reference channel and a corresponding previously captured target channel. The method also includes smoothing the comparison values to generate short-term smoothed comparison values and first long-term smoothed comparison values. The method also includes calculating a cross-correlation value between the comparison values and the short-term smoothed comparison values. The method also includes comparing the cross-correlation value with a threshold, and adjusting the first long-term smoothed comparison values to generate second long-term smoothed comparison values, in response to determination that the cross-correlation value exceeds the threshold. The method further includes estimating a tentative shift value based on the smoothed comparison values. The method also includes non-causally shifting a target channel by a non-causal shift value to generate an adjusted target channel that is temporally aligned with a reference channel. The non-causal shift value is based on the tentative shift value. The method further includes generating, based on the reference channel and the adjusted target channel, at least one of a mid-band channel or a side-band channel.

According to another implementation of the techniques disclosed herein, an apparatus for non-causally shifting a channel includes a first microphone configured to capture a reference channel and a second microphone configured to capture a target channel. The apparatus also includes an encoder configured to estimate comparison values. Each comparison value is indicative of an amount of temporal mismatch between a previously captured reference channel and a corresponding previously captured target channel. The encoder is also configured to smooth the comparison values to generate short-term smoothed comparison values and first long-term smoothed comparison values. The encoder is further configured to calculate a cross-correlation value between the comparison values and the short-term smoothed comparison values. The encoder is further configured to compare the cross-correlation value with a threshold, and adjust the first long-term smoothed comparison values to generate second long-term smoothed comparison values, in response to determination that the cross-correlation value exceeds the threshold. The encoder is further configured to estimate a tentative shift value based on the smoothed comparison values. The encoder is also configured to non-causally shift a target channel by a non-causal shift value to generate an adjusted target channel that is temporally aligned with a reference channel. The non-causal shift value is based on the tentative shift value. The encoder is further configured to generate, based on the reference channel and the adjusted target channel, at least one of a mid-band channel or a side-band channel.

According to another implementation of the techniques disclosed herein, a non-transitory computer-readable medium includes instruction for non-causally shifting a channel. The instructions, when executed by an encoder, cause the encoder to perform operations including estimating comparison values. Each comparison value is indicative of an amount of temporal mismatch between a previously captured reference channel and a corresponding previously captured target channel. The operations also include smoothing the comparison values to generate short-term smoothed comparison values and first long-term smoothed comparison values. The operations also include calculating a cross-correlation value between the comparison values and the short-term smoothed comparison values. The operations also include adjusting the first long-term smoothed comparison values to generate second long-term smoothed comparison values, in response to determination that the cross-correlation exceeds the threshold. The operations also include estimating a tentative shift value based on the smoothed comparison values. The operations also include non-causally shifting a target channel by a non-causal shift value to generate an adjusted target channel that is temporally aligned with a reference channel. The non-causal shift value is based on the tentative shift value. The operations also include generating, based on the reference channel and the adjusted target channel, at least one of a mid-band channel or a side-band channel.

According to another implementation of the techniques disclosed herein, an apparatus for non-causally shifting a channel includes means for estimating comparison values. Each comparison value is indicative of an amount of temporal mismatch between a previously captured reference channel and a corresponding previously captured target channel. The apparatus also includes means for smoothing the comparison values to generate short-term smoothed comparison values and means for smoothing the comparison values to generate first long-term smoothed comparison values. The apparatus also includes means for calculating a cross-correlation value between the comparison values and the short-term smoothed comparison values. The apparatus also includes means for comparing the cross-correlation value with a threshold, and means for adjusting the first long-term smoothed comparison values to generate second long-term smoothed comparison values, in response to determination that the cross-correlation value exceeds the threshold. The apparatus also includes means for estimating a tentative shift value based on the smoothed comparison values. The apparatus also includes means for non-causally shifting a target channel by a non-causal shift value to generate an adjusted target channel that is temporally aligned with a reference channel. The non-causal shift value is based on the tentative shift value. The apparatus also includes means for generating, based on the reference channel and the adjusted target channel, at least one of a mid-band channel or a side-band channel.

V. BRIEF DESCRIPTION OF THE DRAWINGS

VI. DETAILED DESCRIPTION

Figure 1:
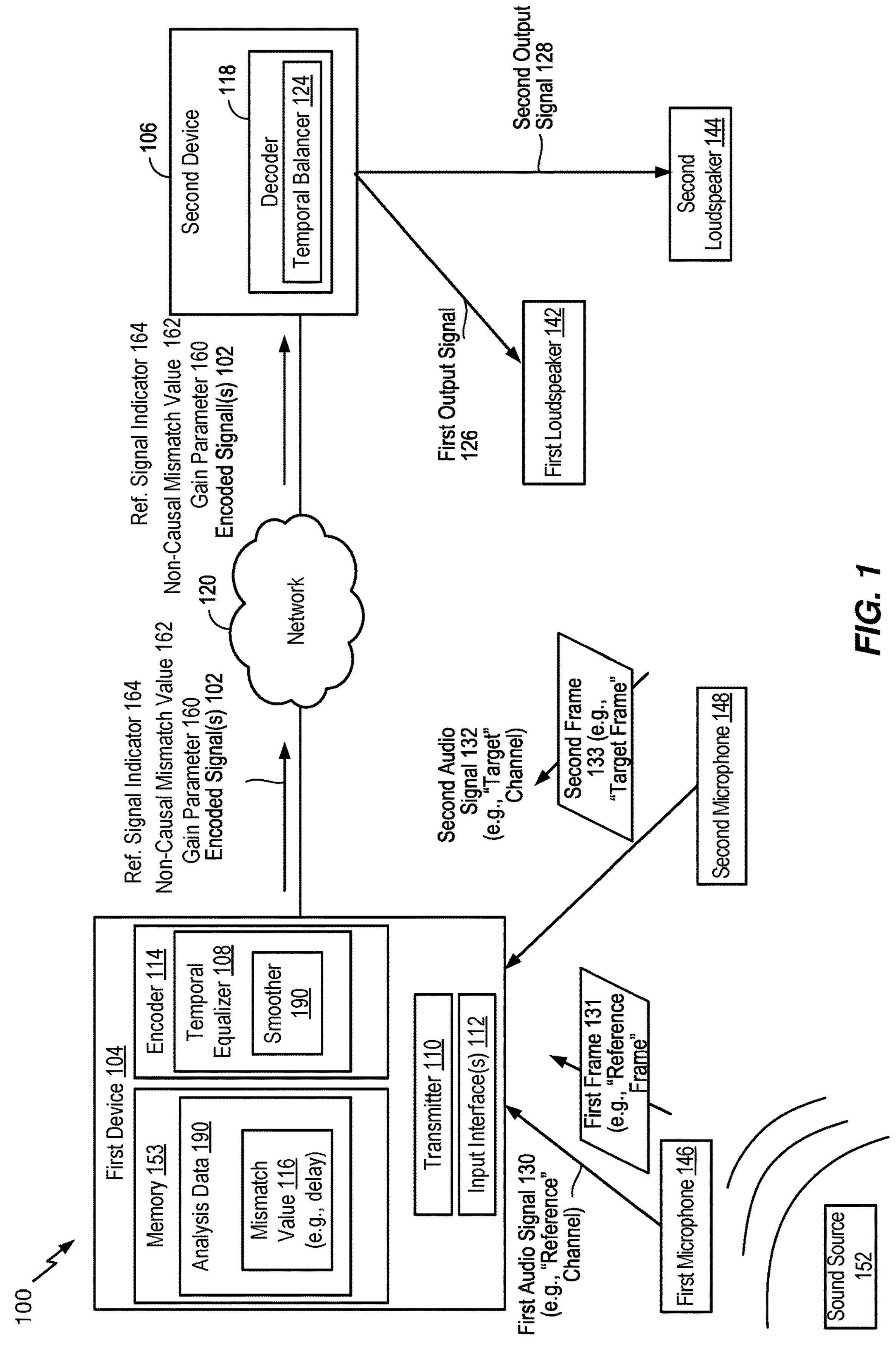
FIG. 1 is a block diagram of a particular illustrative example of a system that includes a device operable to encode multiple channels.

Systems and devices operable to encode multiple audio signals are disclosed. A device may include an encoder configured to encode the multiple audio signals. The multiple audio signals may be captured concurrently in time using multiple recording devices, e.g., multiple microphones. In some examples, the multiple audio signals (or multi-channel audio) may be synthetically (e.g., artificially) generated by multiplexing several audio channels that are recorded at the same time or at different times. As illustrative examples, the concurrent recording or multiplexing of the audio channels may result in a 2-channel configuration (i.e., Stereo: Left and Right), a 5.1 channel configuration (Left, Right, Center, Left Surround, Right Surround, and the low frequency emphasis (LFE) channels), a 7.1 channel configuration, a 7.1+4 channel configuration, a 22.2 channel configuration, or a N-channel configuration.

Audio capture devices in teleconference rooms (or telepresence rooms) may include multiple microphones that acquire spatial audio. The spatial audio may include speech as well as background audio that is encoded and transmitted. The speech/audio from a given source (e.g., a talker) may arrive at the multiple microphones at different times depending on how the microphones are arranged as well as where the source (e.g., the talker) is located with respect to the microphones and room dimensions. For example, a sound source (e.g., a talker) may be closer to a first microphone associated with the device than to a second microphone associated with the device. Thus, a sound emitted from the sound source may reach the first microphone earlier in time than the second microphone. The device may receive a first audio signal via the first microphone and may receive a second audio signal via the second microphone.

Mid-side (MS) coding and parametric stereo (PS) coding are stereo coding techniques that may provide improved efficiency over the dual-mono coding techniques. In dual-mono coding, the Left (L) channel (or signal) and the Right (R) channel (or signal) are independently coded without making use of inter-channel correlation. MS coding reduces the redundancy between a correlated L/R channel-pair by transforming the Left channel and the Right channel to a sum-channel and a difference-channel (e.g., a side channel) prior to coding. The sum signal and the difference signal are waveform coded in MS coding. Relatively more bits are spent on the sum signal than on the side signal. PS coding reduces redundancy in each sub-band by transforming the L/R signals into a sum signal and a set of side parameters. The side parameters may indicate an inter-channel intensity difference (IID), an inter-channel phase difference (IPD), an inter-channel time difference (ITD), etc. The sum signal is waveform coded and transmitted along with the side parameters. In a hybrid system, the side-channel may be waveform coded in the lower bands (e.g., less than 2 kilohertz (kHz)) and PS coded in the upper bands (e.g., greater than or equal to 2 kHz) where the inter-channel phase preservation is perceptually less critical.

The MS coding and the PS coding may be done in either the frequency domain or in the sub-band domain. In some examples, the Left channel and the Right channel may be uncorrelated. For example, the Left channel and the Right channel may include uncorrelated synthetic signals. When the Left channel and the Right channel are uncorrelated, the coding efficiency of the MS coding, the PS coding, or both, may approach the coding efficiency of the dual-mono coding.

Depending on a recording configuration, there may be a temporal shift between a Left channel and a Right channel, as well as other spatial effects such as echo and room reverberation. If the temporal shift and phase mismatch between the channels are not compensated, the sum channel and the difference channel may contain comparable energies reducing the coding-gains associated with MS or PS techniques. The reduction in the coding-gains may be based on the amount of temporal (or phase) shift. The comparable energies of the sum signal and the difference signal may limit the usage of MS coding in certain frames where the channels are temporally shifted but are highly correlated. In stereo coding, a Mid channel (e.g., a sum channel) and a Side channel (e.g., a difference channel) may be generated based on the following Formula:

$$M=(L+R)/2, S=(L-R)/2, \quad \text{Formula 1}$$

where M corresponds to the Mid channel, S corresponds to the Side channel, L corresponds to the Left channel, and R corresponds to the Right channel.

In some cases, the Mid channel and the Side channel may be generated based on the following Formula:

$$M=c\cdot(L+R), S=c\cdot(L-R), \quad \text{Formula 2}$$

where c corresponds to a complex value which is frequency dependent. Generating the Mid channel and the Side channel based on Formula 1 or Formula 2 may be referred to as performing a "down-mixing" algorithm. A reverse process of generating the Left channel and the Right channel from the Mid channel and the Side channel based on Formula 1 or Formula 2 may be referred to as performing an "up-mixing" algorithm.

An ad-hoc approach used to choose between MS coding or dual-mono coding for a particular frame may include generating a mid signal and a side signal, calculating energies of the mid signal and the side signal, and determining whether to perform MS coding based on the energies. For example, MS coding may be performed in response to determining that the ratio of energies of the side signal and the mid signal is less than a threshold. To illustrate, if a Right channel is shifted by at least a first time (e.g., about 0.001 seconds or 48 samples at 48 kHz), a first energy of the mid signal (corresponding to a sum of the left signal and the right signal) may be comparable to a second energy of the side signal (corresponding to a difference between the left signal and the right signal) for voiced speech frames. When the first energy is comparable to the second energy, a higher number of bits may be used to encode the Side channel, thereby reducing coding efficiency of MS coding relative to dual-mono coding. Dual-mono coding may thus be used when the first energy is comparable to the second energy (e.g., when the ratio of the first energy and the second energy is greater than or equal to the threshold). In an alternative approach, the decision between MS coding and dual-mono coding for a particular frame may be made based on a comparison of a threshold and normalized cross-correlation values of the Left channel and the Right channel.

In some examples, the encoder may determine a temporal mismatch value indicative of a temporal shift of the first audio signal relative to the second audio signal. The mismatch value may correspond to an amount of temporal delay between receipt of the first audio signal at the first microphone and receipt of the second audio signal at the second microphone. Furthermore, the encoder may determine the mismatch value on a frame-by-frame basis, e.g., based on each 20 milliseconds (ms) speech/audio frame. For example, the mismatch value may correspond to an amount of time that a second frame of the second audio signal is delayed with respect to a first frame of the first audio signal. Alternatively, the mismatch value may correspond to an amount of time that the first frame of the first audio signal is delayed with respect to the second frame of the second audio signal.

When the sound source is closer to the first microphone than to the second microphone, frames of the second audio signal may be delayed relative to frames of the first audio signal. In this case, the first audio signal may be referred to as the "reference audio signal" or "reference channel" and the delayed second audio signal may be referred to as the "target audio signal" or "target channel". Alternatively, when the sound source is closer to the second microphone than to the first microphone, frames of the first audio signal may be delayed relative to frames of the second audio signal. In this case, the second audio signal may be referred to as the reference audio signal or reference channel and the delayed first audio signal may be referred to as the target audio signal or target channel.

Depending on where the sound sources (e.g., talkers) are located in a conference or telepresence room or how the sound source (e.g., talker) position changes relative to the microphones, the reference channel and the target channel may change from one frame to another; similarly, the temporal delay value may also change from one frame to another. However, in some implementations, the mismatch value may always be positive to indicate an amount of delay of the "target" channel relative to the "reference" channel. Furthermore, the mismatch value may correspond to a "non-causal shift" value by which the delayed target channel is "pulled back" in time such that the target channel is aligned (e.g., maximally aligned) with the "reference" channel. The down mix algorithm to determine the mid channel and the side channel may be performed on the reference channel and the non-causal shifted target channel.

The encoder may determine the mismatch value based on the reference audio channel and a plurality of mismatch values applied to the target audio channel. For example, a first frame of the reference audio channel, X, may be received at a first time ($m_1$). A first particular frame of the target audio channel, Y, may be received at a second time ($n_1$) corresponding to a first mismatch value, e.g., shift1=$n_1-m_1$. Further, a second frame of the reference audio channel may be received at a third time ($m_2$). A second particular frame of the target audio channel may be received at a fourth time ($n_2$) corresponding to a second mismatch value, e.g., shift2=$n_2-m_2$.

The device may perform a framing or a buffering algorithm to generate a frame (e.g., 20 ms samples) at a first sampling rate (e.g., 32 kHz sampling rate (i.e., 640 samples per frame)). The encoder may, in response to determining that a first frame of the first audio signal and a second frame of the second audio signal arrive at the same time at the device, estimate a mismatch value (e.g., shift1) as equal to zero samples. A Left channel (e.g., corresponding to the first audio signal) and a Right channel (e.g., corresponding to the second audio signal) may be temporally aligned. In some cases, the Left channel and the Right channel, even when aligned, may differ in energy due to various reasons (e.g., microphone calibration).

In some examples, the Left channel and the Right channel may be temporally not aligned due to various reasons (e.g., a sound source, such as a talker, may be closer to one of the microphones than another and the two microphones may be greater than a threshold (e.g., 1-20 centimeters) distance apart). A location of the sound source relative to the microphones may introduce different delays in the Left channel and the Right channel. In addition, there may be a gain difference, an energy difference, or a level difference between the Left channel and the Right channel.

In some examples, a time of arrival of audio signals at the microphones from multiple sound sources (e.g., talkers) may vary when the multiple talkers are alternatively talking (e.g., without overlap). In such a case, the encoder may dynamically adjust a temporal mismatch value based on the talker to identify the reference channel. In some other examples, the multiple talkers may be talking at the same time, which may result in varying temporal mismatch values depending on who is the loudest talker, closest to the microphone, etc.

In some examples, the first audio signal and second audio signal may be synthesized or artificially generated when the two signals potentially show less (e.g., no) correlation. It should be understood that the examples described herein are illustrative and may be instructive in determining a relationship between the first audio signal and the second audio signal in similar or different situations.

The encoder may generate comparison values (e.g., difference values or cross-correlation values) based on a comparison of a first frame of the first audio signal and a plurality of frames of the second audio signal. Each frame of the plurality of frames may correspond to a particular mismatch value. The encoder may generate a first estimated mismatch value based on the comparison values. For example, the first estimated mismatch value may correspond to a comparison value indicating a higher temporal-similarity (or lower difference) between the first frame of the first audio signal and a corresponding first frame of the second audio signal.

The encoder may determine the final mismatch value by refining, in multiple stages, a series of estimated mismatch values. For example, the encoder may first estimate a "tentative" mismatch value based on comparison values generated from stereo pre-processed and re-sampled versions of the first audio signal and the second audio signal. The encoder may generate interpolated comparison values associated with mismatch values proximate to the estimated "tentative" mismatch value. The encoder may determine a second estimated "interpolated" mismatch value based on the interpolated comparison values. For example, the second estimated "interpolated" mismatch value may correspond to a particular interpolated comparison value that indicates a higher temporal-similarity (or lower difference) than the remaining interpolated comparison values and the first estimated "tentative" mismatch value. If the second estimated "interpolated" mismatch value of the current frame (e.g., the first frame of the first audio signal) is different than a final mismatch value of a previous frame (e.g., a frame of the first audio signal that precedes the first frame), then the "interpolated" mismatch value of the current frame is further "amended" to improve the temporal-similarity between the first audio signal and the shifted second audio signal. In particular, a third estimated "amended" mismatch value may correspond to a more accurate measure of temporal-similarity by searching around the second estimated "interpolated" mismatch value of the current frame and the final estimated mismatch value of the previous frame. The third estimated "amended" mismatch value is further conditioned to estimate the final mismatch value by limiting any spurious changes in the mismatch value between frames and further controlled to not switch from a negative mismatch value to a positive mismatch value (or vice versa) in two successive (or consecutive) frames as described herein.

In some examples, the encoder may refrain from switching between a positive mismatch value and a negative mismatch value or vice-versa in consecutive frames or in adjacent frames. For example, the encoder may set the final mismatch value to a particular value (e.g., 0) indicating no temporal-shift based on the estimated "interpolated" or "amended" mismatch value of the first frame and a corresponding estimated "interpolated" or "amended" or final mismatch value in a particular frame that precedes the first frame. To illustrate, the encoder may set the final mismatch value of the current frame (e.g., the first frame) to indicate no temporal-shift, i.e., shift1=0, in response to determining that one of the estimated "tentative" or "interpolated" or "amended" mismatch value of the current frame is positive and the other of the estimated "tentative" or "interpolated" or "amended" or "final" estimated mismatch value of the previous frame (e.g., the frame preceding the first frame) is negative. Alternatively, the encoder may also set the final mismatch value of the current frame (e.g., the first frame) to indicate no temporal-shift, i.e., shift1=0, in response to determining that one of the estimated "tentative" or "interpolated" or "amended" mismatch value of the current frame is negative and the other of the estimated "tentative" or "interpolated" or "amended" or "final" estimated mismatch value of the previous frame (e.g., the frame preceding the first frame) is positive.

The encoder may select a frame of the first audio signal or the second audio signal as a "reference" or "target" based on the mismatch value. For example, in response to determining that the final mismatch value is positive, the encoder may generate a reference channel or signal indicator having a first value (e.g., 0) indicating that the first audio signal is a "reference" signal and that the second audio signal is the "target" signal. Alternatively, in response to determining that the final mismatch value is negative, the encoder may generate the reference channel or signal indicator having a second value (e.g., 1) indicating that the second audio signal is the "reference" signal and that the first audio signal is the "target" signal.

The encoder may estimate a relative gain (e.g., a relative gain parameter) associated with the reference signal and the non-causal shifted target signal. For example, in response to determining that the final mismatch value is positive, the encoder may estimate a gain value to normalize or equalize the energy or power levels of the first audio signal relative to the second audio signal that is offset by the non-causal mismatch value (e.g., an absolute value of the final mismatch value). Alternatively, in response to determining that the final mismatch value is negative, the encoder may estimate a gain value to normalize or equalize the power levels of the non-causal shifted first audio signal relative to the second audio signal. In some examples, the encoder may estimate a gain value to normalize or equalize the energy or power levels of the "reference" signal relative to the non-causal shifted "target" signal. In other examples, the encoder may estimate the gain value (e.g., a relative gain value) based on the reference signal relative to the target signal (e.g., the un-shifted target signal).

The encoder may generate at least one encoded signal (e.g., a mid signal, a side signal, or both) based on the reference signal, the target signal, the non-causal mismatch value, and the relative gain parameter. The side signal may correspond to a difference between first samples of the first frame of the first audio signal and selected samples of a selected frame of the second audio signal. The encoder may select the selected frame based on the final mismatch value. Fewer bits may be used to encode the side channel because of reduced difference between the first samples and the selected samples as compared to other samples of the second audio signal that correspond to a frame of the second audio signal that is received by the device at the same time as the first frame. A transmitter of the device may transmit the at least one encoded signal, the non-causal mismatch value, the relative gain parameter, the reference channel or signal indicator, or a combination thereof.

The encoder may generate at least one encoded signal (e.g., a mid signal, a side signal, or both) based on the reference signal, the target signal, the non-causal mismatch value, the relative gain parameter, low band parameters of a particular frame of the first audio signal, high band parameters of the particular frame, or a combination thereof. The particular frame may precede the first frame. Certain low band parameters, high band parameters, or a combination thereof, from one or more preceding frames may be used to encode a mid signal, a side signal, or both, of the first frame. Encoding the mid signal, the side signal, or both, based on the low band parameters, the high band parameters, or a combination thereof, may improve estimates of the non-causal mismatch value and inter-channel relative gain parameter. The low band parameters, the high band parameters, or a combination thereof, may include a pitch parameter, a voicing parameter, a coder type parameter, a low-band energy parameter, a high-band energy parameter, a tilt parameter, a pitch gain parameter, a FCB gain parameter, a coding mode parameter, a voice activity parameter, a noise estimate parameter, a signal-to-noise ratio parameter, a formants parameter, a speech/music decision parameter, the non-causal shift, the inter-channel gain parameter, or a combination thereof. A transmitter of the device may transmit the at least one encoded signal, the non-causal mismatch value, the relative gain parameter, the reference channel (or signal) indicator, or a combination thereof.

Referring to FIG. 1, a particular illustrative example of a system is disclosed and generally designated 100. The system 100 includes a first device 104 communicatively coupled, via a network 120, to a second device 106. The network 120 may include one or more wireless networks, one or more wired networks, or a combination thereof.

The first device 104 may include an encoder 114, a transmitter 110, one or more input interfaces 112, or a combination thereof. A first input interface of the input interfaces 112 may be coupled to a first microphone 146. A second input interface of the input interface(s) 112 may be coupled to a second microphone 148. The encoder 114 may include a temporal equalizer 108 and may be configured to down mix and encode multiple audio signals, as described herein. The first device 104 may also include a memory 153 configured to store analysis data 190. The second device 106 may include a decoder 118. The decoder 118 may include a temporal balancer 124 that is configured to up-mix and render the multiple channels. The second device 106 may be coupled to a first loudspeaker 142, a second loudspeaker 144, or both.

During operation, the first device 104 may receive a first audio signal 130 (e.g., a first channel) via the first input interface from the first microphone 146 and may receive a second audio signal 132 (e.g., a second channel) via the second input interface from the second microphone 148. As used herein, "signal" and "channel" may be used interchangeably. The first audio signal 130 may correspond to one of a right channel or a left channel. The second audio signal 132 may correspond to the other of the right channel or the left channel. In the example of FIG. 1, the first audio signal 130 is a reference channel and the second audio signal 132 is a target channel. Thus, according to the implementations described herein, the second audio signal 132 may be adjusted to temporally align with the first audio signal 130. However, as described below, in other implementations, the first audio signal 130 may be the target channel and the second audio signal 132 may be the reference channel.

A sound source 152 (e.g., a user, a speaker, ambient noise, a musical instrument, etc.) may be closer to the first microphone 146 than to the second microphone 148. Accordingly, an audio signal from the sound source 152 may be received at the input interface(s) 112 via the first microphone 146 at an earlier time than via the second microphone 148. This natural delay in the multi-channel signal acquisition through the multiple microphones may introduce a temporal shift between the first audio signal 130 and the second audio signal 132.

The temporal equalizer 108 may be configured to estimate a temporal offset between audio captured at the microphones 146, 148. The temporal offset may be estimated based on a delay between a first frame 131 (e.g., a "reference frame") of the first audio signal 130 and a second frame 133 (e.g., a "target frame") of the second audio signal 132, where the second frame 133 includes substantially similar content as the first frame 131. For example, the temporal equalizer 108 may determine a cross-correlation between the first frame 131 and the second frame 133. The cross-correlation may measure the similarity of the two frames as a function of the lag of one frame relative to the other. Based on the cross-correlation, the temporal equalizer 108 may determine the delay (e.g., lag) between the first frame 131 and the second frame 133. The temporal equalizer 108 may estimate the temporal offset between the first audio signal 130 and the second audio signal 132 based on the delay and historical delay data.

The historical data may include delays between frames captured from the first microphone 146 and corresponding frames captured from the second microphone 148. For example, the temporal equalizer 108 may determine a cross-correlation (e.g., a lag) between previous frames associated with the first audio signal 130 and corresponding frames associated with the second audio signal 132.

Each lag may be represented by a "comparison value." That is, a comparison value may indicate a time shift (k) between a frame of the first audio signal 130 and a corresponding frame of the second audio signal 132. In accordance with the disclosure herein, comparison value may additionally indicate an amount of temporal mismatch, or a measure of the similarity or dissimilarity between a first reference frame of a reference channel and a corresponding first target frame of a target channel. In some implementations, cross-correlation function between the reference frame and the target frame may be used to measure the similarity of the two frames as a function of the lag of one frame relative to the other. According to one implementation, the comparison values (e.g., cross-correlation values) for previous frames may be stored at the memory 153. A smoother 190 of the temporal equalizer 108 may "smooth" (or average) comparison values over a long-term set of frames and use the long-term smoothed comparison values for estimating a temporal offset (e.g., "shift") between the first audio signal 130 and the second audio signal 132.

To illustrate, if $CompVal_N(k)$ represents the comparison value at a shift of k for the frame N, the frame N may have comparison values from k=T_MIN (a minimum shift) to k=T_MAX (a maximum shift). The smoothing may be performed such that a long-term smoothed comparison value $CompVal_{LT_N}(k)$ is represented by $CompVal_{LT_N}(k)=f(CompVal_N(k), CompVal_{N-1}(k), CompVal_{LT_{N-2}}(k), \ldots)$. The function $f$ in the above equation may be a function of all (or a subset) of past comparison values at the shift (k). An alternative representation of the may be $CompVal_{LT_N}(k)=g(CompVal_N(k), CompVal_{N-1}(k), CompVal_{N-2}(k), \ldots)$. The functions $f$ or g may be simple finite impulse response (FIR) filters or infinite impulse response (IIR) filters, respectively. For example, the function g may be a single tap IIR filter such that the long-term smoothed comparison value $CompVal_{LT_N}(k)$ is represented by $CompVal_{LT_N}(k)=(1-\alpha)*CompVal_N(k)+(\alpha)*CompVal_{LT_{N-1}}(k)$, where $\alpha \in (0, 1.0)$. Thus, the long-term smoothed comparison value $CompVal_{LT_N}(k)$ may be based on a weighted mixture of the instantaneous comparison value $CompVal_N(k)$ at frame N and the long-term smoothed comparison values $CompVal_{LT_{N-1}}(k)$ for one or more previous frames. As the value of $\alpha$ increases, the amount of smoothing in the long-term smoothed comparison value increases. In some implementations, the comparison values may be normalized cross-correlation values. In other implementations, the comparison values may be non-normalized cross-correlation values.

The smoothing techniques described above may substantially normalize the shift estimate between voiced frames, unvoiced frames, and transition frames. Normalized shift estimates may reduce sample repetition and artifact skipping at frame boundaries. Additionally, normalized shift estimates may result in reduced side channel energies, which may improve coding efficiency.

The temporal equalizer 108 may determine a final mismatch value 116 (e.g., a non-causal mismatch value) indicative of the shift (e.g., a non-causal mismatch or a non-causal shift) of the first audio signal 130 (e.g., "reference") relative to the second audio signal 132 (e.g., "target"). The final mismatch value 116 may be based on the instantaneous comparison value $CompVal_N(k)$ and the long-term smoothed comparison $CompVal_{LT_{N-1}}(k)$. For example, the smoothing operation described above may be performed on a tentative mismatch value, on an interpolated mismatch value, on an amended mismatch value, or a combination thereof, as described with respect to FIG. 5. The first mismatch value 116 may be based on the tentative mismatch value, the interpolated mismatch value, and the amended mismatch value, as described with respect to FIG. 5. A first value (e.g., a positive value) of the final mismatch value 116 may indicate that the second audio signal 132 is delayed relative to the first audio signal 130. A second value (e.g., a negative value) of the final mismatch value 116 may indicate that the first audio signal 130 is delayed relative to the second audio signal 132. A third value (e.g., 0) of the final mismatch value 116 may indicate no delay between the first audio signal 130 and the second audio signal 132.

In some implementations, the third value (e.g., 0) of the final mismatch value 116 may indicate that delay between the first audio signal 130 and the second audio signal 132 has switched sign. For example, a first particular frame of the first audio signal 130 may precede the first frame 131. The first particular frame and a second particular frame of the second audio signal 132 may correspond to the same sound emitted by the sound source 152. The delay between the first audio signal 130 and the second audio signal 132 may switch from having the first particular frame delayed with respect to the second particular frame to having the second frame 133 delayed with respect to the first frame 131. Alternatively, the delay between the first audio signal 130 and the second audio signal 132 may switch from having the second particular frame delayed with respect to the first particular frame to having the first frame 131 delayed with respect to the second frame 133. The temporal equalizer 108 may set the final mismatch value 116 to indicate the third value (e.g., 0) in response to determining that the delay between the first audio signal 130 and the second audio signal 132 has switched sign.

The temporal equalizer 108 may generate a reference signal indicator 164 based on the final mismatch value 116. For example, the temporal equalizer 108 may, in response to determining that the final mismatch value 116 indicates a first value (e.g., a positive value), generate the reference signal indicator 164 to have a first value (e.g., 0) indicating that the first audio signal 130 is a "reference" signal. The temporal equalizer 108 may determine that the second audio signal 132 corresponds to a "target" signal in response to determining that the final mismatch value 116 indicates the first value (e.g., a positive value). Alternatively, the temporal equalizer 108 may, in response to determining that the final mismatch value 116 indicates a second value (e.g., a negative value), generate the reference signal indicator 164 to have a second value (e.g., 1) indicating that the second audio signal 132 is the "reference" signal. The temporal equalizer 108 may determine that the first audio signal 130 corresponds to the "target" signal in response to determining that the final mismatch value 116 indicates the second value (e.g., a negative value). The temporal equalizer 108 may, in response to determining that the final mismatch value 116 indicates a third value (e.g., 0), generate the reference signal indicator 164 to have a first value (e.g., 0) indicating that the first audio signal 130 is a "reference" signal. The temporal equalizer 108 may determine that the second audio signal 132 corresponds to a "target" signal in response to determining that the final mismatch value 116 indicates the third value (e.g., 0). Alternatively, the temporal equalizer 108 may, in response to determining that the final mismatch value 116 indicates the third value (e.g., 0), generate the reference signal indicator 164 to have a second value (e.g., 1) indicating that the second audio signal 132 is a "reference" signal. The temporal equalizer 108 may determine that the first audio signal 130 corresponds to a "target" signal in response to determining that the final mismatch value 116 indicates the third value (e.g., 0). In some implementations, the temporal equalizer 108 may, in response to determining that the final mismatch value 116 indicates a third value (e.g., 0), leave the reference signal indicator 164 unchanged. For example, the reference signal indicator 164 may be the same as a reference signal indicator corresponding to the first particular frame of the first audio signal 130. The temporal equalizer 108 may generate a non-causal mismatch value 162 indicating an absolute value of the final mismatch value 116.

The temporal equalizer 108 may generate a gain parameter 160 (e.g., a codec gain parameter) based on samples of the "target" signal and based on samples of the "reference" signal. For example, the temporal equalizer 108 may select samples of the second audio signal 132 based on the non-causal mismatch value 162. Alternatively, the temporal equalizer 108 may select samples of the second audio signal 132 independent of the non-causal mismatch value 162. The temporal equalizer 108 may, in response to determining that the first audio signal 130 is the reference signal, determine the gain parameter 160 of the selected samples based on the first samples of the first frame 131 of the first audio signal 130. Alternatively, the temporal equalizer 108 may, in response to determining that the second audio signal 132 is the reference signal, determine the gain parameter 160 of the first samples based on the selected samples. As an example, the gain parameter 160 may be based on one of the following Equations:

$$g_D = \frac{\sum_{n=0}^{N-N_1} Ref(n)Targ(n+N_1)}{\sum_{n=0}^{N-N_1} Targ^2(n+N_1)} \quad \text{Equation 1a}$$

$$g_D = \frac{\sum_{n=0}^{N-N_1} |Ref(n)|}{\sum_{n=0}^{N-N_1} |Targ(n+N_1)|} \quad \text{Equation 1b}$$

$$g_D = \frac{\sum_{n=0}^{N} Ref(n)Targ(n)}{\sum_{n=0}^{N} Targ^2(n)} \quad \text{Equation 1c}$$

$$g_D = \frac{\sum_{n=0}^{N} |Ref(n)|}{\sum_{n=0}^{N-N_1} |Targ(n+N_1)|} \quad \text{Equation 1d}$$

$$g_D = \frac{\sum_{n=0}^{N-N_1} Ref(n)Targ(n)}{\sum_{n=0}^{N} Ref^2(n)}, \quad \text{Equation 1e}$$

$$g_D = \frac{\sum_{n=0}^{N-N_1} |Targ(n)|}{\sum_{n=0}^{N} |Ref(n)|} \quad \text{Equation 1f}$$

where $g_D$ corresponds to the relative gain parameter 160 for down mix processing, Ref(n) corresponds to samples of the "reference" signal, $N_1$ corresponds to the non-causal mismatch value 162 of the first frame 131, and Targ(n+$N_1$) corresponds to samples of the "target" signal. The gain parameter 160 ($g_D$) may be modified, e.g., based on one of the Equations 1a-1f, to incorporate long-term smoothing/hysteresis logic to avoid large jumps in gain between frames. When the target signal includes the first audio signal 130, the first samples may include samples of the target signal and the selected samples may include samples of the reference signal. When the target signal includes the second audio signal 132, the first samples may include samples of the reference signal, and the selected samples may include samples of the target signal.

In some implementations, the temporal equalizer 108 may generate the gain parameter 160 based on treating the first audio signal 130 as a reference signal and treating the second audio signal 132 as a target signal, irrespective of the reference signal indicator 164. For example, the temporal equalizer 108 may generate the gain parameter 160 based on one of the Equations 1a-1f where Ref(n) corresponds to samples (e.g., the first samples) of the first audio signal 130 and Targ(n+$N_1$) corresponds to samples (e.g., the selected samples) of the second audio signal 132. In alternate implementations, the temporal equalizer 108 may generate the gain parameter 160 based on treating the second audio signal 132 as a reference signal and treating the first audio signal 130 as a target signal, irrespective of the reference signal indicator 164. For example, the temporal equalizer 108 may generate the gain parameter 160 based on one of the Equations 1a-1f where Ref(n) corresponds to samples (e.g., the selected samples) of the second audio signal 132 and Targ (n+$N_1$) corresponds to samples (e.g., the first samples) of the first audio signal 130.

The temporal equalizer 108 may generate one or more encoded signals 102 (e.g., a mid channel, a side channel, or both) based on the first samples, the selected samples, and the relative gain parameter 160 for down mix processing.

For example, the temporal equalizer 108 may generate the mid signal based on one of the following Equations:

$$M=\mathrm{Ref}(n)+g_D\mathrm{Targ}(n+N_1), \quad \text{Equation 2a}$$

$$M=\mathrm{Ref}(n)+\mathrm{Targ}(n+N_1), \quad \text{Equation 2b}$$

where M corresponds to the mid channel, $g_D$ corresponds to the relative gain parameter 160 for downmix processing, Ref(n) corresponds to samples of the "reference" signal, $N_1$ corresponds to the non-causal mismatch value 162 of the first frame 131, and $\mathrm{Targ}(n+N_1)$ corresponds to samples of the "target" signal.

The temporal equalizer 108 may generate the side channel based on one of the following Equations:

$$S=\mathrm{Ref}(n)-g_D\mathrm{Targ}(n+N_1), \quad \text{Equation 3a}$$

$$S=g_D\mathrm{Ref}(n)-\mathrm{Targ}(n+N_1), \quad \text{Equation 3b}$$

where S corresponds to the side channel, $g_D$ corresponds to the relative gain parameter 160 for down-mix processing, Ref(n) corresponds to samples of the "reference" signal, $N_1$ corresponds to the non-causal mismatch value 162 of the first frame 131, and $\mathrm{Targ}(n+N_1)$ corresponds to samples of the "target" signal.

The transmitter 110 may transmit the encoded signals 102 (e.g., the mid channel, the side channel, or both), the reference signal indicator 164, the non-causal mismatch value 162, the gain parameter 160, or a combination thereof, via the network 120, to the second device 106. In some implementations, the transmitter 110 may store the encoded signals 102 (e.g., the mid channel, the side channel, or both), the reference signal indicator 164, the non-causal mismatch value 162, the gain parameter 160, or a combination thereof, at a device of the network 120 or a local device for further processing or decoding later.

The decoder 118 may decode the encoded signals 102. The temporal balancer 124 may perform up-mixing to generate a first output signal 126 (e.g., corresponding to first audio signal 130), a second output signal 128 (e.g., corresponding to the second audio signal 132), or both. The second device 106 may output the first output signal 126 via the first loudspeaker 142. The second device 106 may output the second output signal 128 via the second loudspeaker 144.

The system 100 may thus enable the temporal equalizer 108 to encode the side channel using fewer bits than the mid signal. The first samples of the first frame 131 of the first audio signal 130 and selected samples of the second audio signal 132 may correspond to the same sound emitted by the sound source 152 and hence a difference between the first samples and the selected samples may be lower than between the first samples and other samples of the second audio signal 132. The side channel may correspond to the difference between the first samples and the selected samples.

Figure 2:
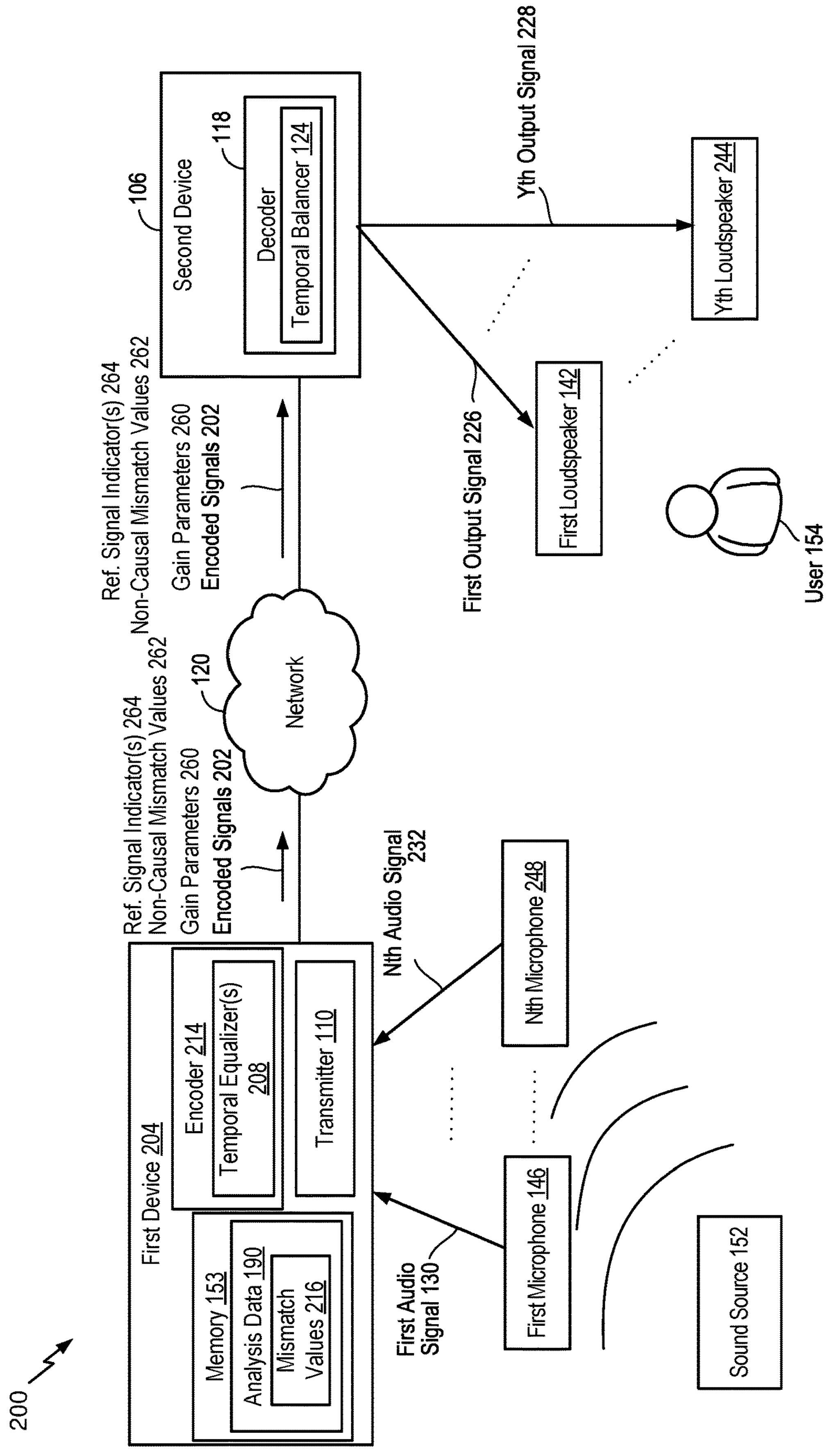
FIG. 2 is a diagram illustrating another example of a system that includes the device of FIG. 1.

Referring to FIG. 2, a particular illustrative implementation of a system is disclosed and generally designated 200. The system 200 includes a first device 204 coupled, via the network 120, to the second device 106. The first device 204 may correspond to the first device 104 of FIG. 1. The system 200 differs from the system 100 of FIG. 1 in that the first device 204 is coupled to more than two microphones. For example, the first device 204 may be coupled to the first microphone 146, an Nth microphone 248, and one or more additional microphones (e.g., the second microphone 148 of FIG. 1). The second device 106 may be coupled to the first loudspeaker 142, a Yth loudspeaker 244, one or more additional speakers (e.g., the second loudspeaker 144), or a combination thereof. The first device 204 may include an encoder 214. The encoder 214 may correspond to the encoder 114 of FIG. 1. The encoder 214 may include one or more temporal equalizers 208. For example, the temporal equalizer(s) 208 may include the temporal equalizer 108 of FIG. 1.

During operation, the first device 204 may receive more than two audio signals. For example, the first device 204 may receive the first audio signal 130 via the first microphone 146, an Nth audio signal 232 via the Nth microphone 248, and one or more additional audio signals (e.g., the second audio signal 132) via the additional microphones (e.g., the second microphone 148).

The temporal equalizer(s) 208 may generate one or more reference signal indicators 264, final mismatch values 216, non-causal mismatch values 262, gain parameters 260, encoded signals 202, or a combination thereof. For example, the temporal equalizer(s) 208 may determine that the first audio signal 130 is a reference signal and that each of the Nth audio signal 232 and the additional audio signals is a target signal. The temporal equalizer(s) 208 may generate the reference signal indicator 164, the final mismatch values 216, the non-causal mismatch values 262, the gain parameters 260, and the encoded signals 202 corresponding to the first audio signal 130 and each of the Nth audio signal 232 and the additional audio signals.

The reference signal indicators 264 may include the reference signal indicator 164. The final mismatch values 216 may include the final mismatch value 116 indicative of a shift of the second audio signal 132 relative to the first audio signal 130, a second final mismatch value indicative of a shift of the Nth audio signal 232 relative to the first audio signal 130, or both. The non-causal mismatch values 262 may include the non-causal mismatch value 162 corresponding to an absolute value of the final mismatch value 116, a second non-causal mismatch value corresponding to an absolute value of the second final mismatch value, or both. The gain parameters 260 may include the gain parameter 160 of selected samples of the second audio signal 132, a second gain parameter of selected samples of the Nth audio signal 232, or both. The encoded signals 202 may include at least one of the encoded signals 102. For example, the encoded signals 202 may include the side channel corresponding to first samples of the first audio signal 130 and selected samples of the second audio signal 132, a second side channel corresponding to the first samples and selected samples of the Nth audio signal 232, or both. The encoded signals 202 may include a mid channel corresponding to the first samples, the selected samples of the second audio signal 132, and the selected samples of the Nth audio signal 232.

In some implementations, the temporal equalizer(s) 208 may determine multiple reference signals and corresponding target signals, as described with reference to FIG. 11. For example, the reference signal indicators 264 may include a reference signal indicator corresponding to each pair of reference signal and target signal. To illustrate, the reference signal indicators 264 may include the reference signal indicator 164 corresponding to the first audio signal 130 and the second audio signal 132. The final mismatch values 216 may include a final mismatch value corresponding to each pair of reference signal and target signal. For example, the final mismatch values 216 may include the final mismatch value 116 corresponding to the first audio signal 130 and the second audio signal 132. The non-causal mismatch values 262 may include a non-causal mismatch value corresponding to each pair of reference signal and target signal. For example, the non-causal mismatch values 262 may include the non-causal mismatch value 162 corresponding to the first audio signal 130 and the second audio signal 132. The gain parameters 260 may include a gain parameter corresponding to each pair of reference signal and target signal. For example, the gain parameters 260 may include the gain parameter 160 corresponding to the first audio signal 130 and the second audio signal 132. The encoded signals 202 may include a mid channel and a side channel corresponding to each pair of reference signal and target signal. For example, the encoded signals 202 may include the encoded signals 102 corresponding to the first audio signal 130 and the second audio signal 132.

The transmitter 110 may transmit the reference signal indicators 264, the non-causal mismatch values 262, the gain parameters 260, the encoded signals 202, or a combination thereof, via the network 120, to the second device 106. The decoder 118 may generate one or more output signals based on the reference signal indicators 264, the non-causal mismatch values 262, the gain parameters 260, the encoded signals 202, or a combination thereof. For example, the decoder 118 may output a first output signal 226 via the first loudspeaker 142, a Yth output signal 228 via the Yth loudspeaker 244, one or more additional output signals (e.g., the second output signal 128) via one or more additional loudspeakers (e.g., the second loudspeaker 144), or a combination thereof.

The system 200 may thus enable the temporal equalizer(s) 208 to encode more than two audio signals. For example, the encoded signals 202 may include multiple side channels that are encoded using fewer bits than corresponding mid channels by generating the side channels based on the non-causal mismatch values 262.

Figure 3:
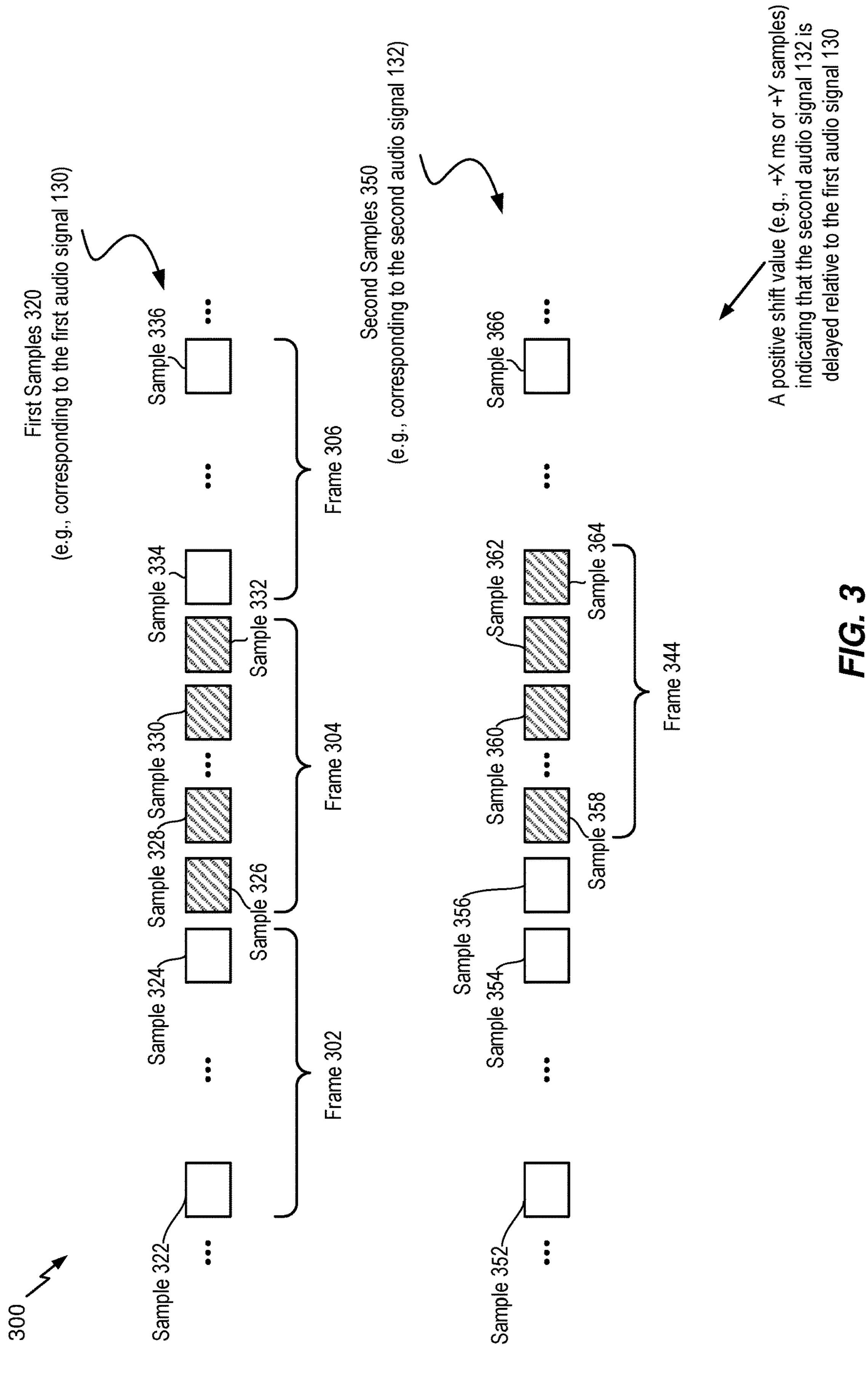
FIG. 3 is a diagram illustrating particular examples of samples that may be encoded by the device of FIG. 1.

Referring to FIG. 3, illustrative examples of samples are shown and generally designated 300. At least a subset of the samples 300 may be encoded by the first device 104, as described herein. The samples 300 may include first samples 320 corresponding to the first audio signal 130, second samples 350 corresponding to the second audio signal 132, or both. The first samples 320 may include a sample 322, a sample 324, a sample 326, a sample 328, a sample 330, a sample 332, a sample 334, a sample 336, one or more additional samples, or a combination thereof. The second samples 350 may include a sample 352, a sample 354, a sample 356, a sample 358, a sample 360, a sample 362, a sample 364, a sample 366, one or more additional samples, or a combination thereof.

The first audio signal 130 may correspond to a plurality of frames (e.g., a frame 302, a frame 304, a frame 306, or a combination thereof). Each of the plurality of frames may correspond to a subset of samples (e.g., corresponding to 20 ms, such as 640 samples at 32 kHz or 960 samples at 48 kHz) of the first samples 320. For example, the frame 302 may correspond to the sample 322, the sample 324, one or more additional samples, or a combination thereof. The frame 304 may correspond to the sample 326, the sample 328, the sample 330, the sample 332, one or more additional samples, or a combination thereof. The frame 306 may correspond to the sample 334, the sample 336, one or more additional samples, or a combination thereof.

The sample 322 may be received at the input interface(s) 112 of FIG. 1 at approximately the same time as the sample 352. The sample 324 may be received at the input interface(s) 112 of FIG. 1 at approximately the same time as the sample 354. The sample 326 may be received at the input interface(s) 112 of FIG. 1 at approximately the same time as the sample 356. The sample 328 may be received at the input interface(s) 112 of FIG. 1 at approximately the same time as the sample 358. The sample 330 may be received at the input interface(s) 112 of FIG. 1 at approximately the same time as the sample 360. The sample 332 may be received at the input interface(s) 112 of FIG. 1 at approximately the same time as the sample 362. The sample 334 may be received at the input interface(s) 112 of FIG. 1 at approximately the same time as the sample 364. The sample 336 may be received at the input interface(s) 112 of FIG. 1 at approximately the same time as the sample 366.

A first value (e.g., a positive value) of the final mismatch value 116 may indicate that the second audio signal 132 is delayed relative to the first audio signal 130. For example, a first value (e.g., +X ms or +Y samples, where X and Y include positive real numbers) of the final mismatch value 116 may indicate that the frame 304 (e.g., the samples 326-332) correspond to the samples 358-364. The samples 326-332 and the samples 358-364 may correspond to the same sound emitted from the sound source 152. The samples 358-364 may correspond to a frame 344 of the second audio signal 132. Illustration of samples with cross-hatching in one or more of FIGS. 1-14 may indicate that the samples correspond to the same sound. For example, the samples 326-332 and the samples 358-364 are illustrated with cross-hatching in FIG. 3 to indicate that the samples 326-332 (e.g., the frame 304) and the samples 358-364 (e.g., the frame 344) correspond to the same sound emitted from the sound source 152.

It should be understood that a temporal offset of Y samples, as shown in FIG. 3, is illustrative. For example, the temporal offset may correspond to a number of samples, Y, that is greater than or equal to 0. In a first case where the temporal offset Y=0 samples, the samples 326-332 (e.g., corresponding to the frame 304) and the samples 356-362 (e.g., corresponding to the frame 344) may show high similarity without any frame offset. In a second case where the temporal offset Y=2 samples, the frame 304 and frame 344 may be offset by 2 samples. In this case, the first audio signal 130 may be received prior to the second audio signal 132 at the input interface(s) 112 by Y=2 samples or X=(2/Fs) ms, where Fs corresponds to the sample rate in kHz. In some cases, the temporal offset, Y, may include a non-integer value, e.g., Y=1.6 samples corresponding to X=0.05 ms at 32 kHz.

The temporal equalizer 108 of FIG. 1 may generate the encoded signals 102 by encoding the samples 326-332 and the samples 358-364, as described with reference to FIG. 1. The temporal equalizer 108 may determine that the first audio signal 130 corresponds to a reference signal and that the second audio signal 132 corresponds to a target signal.

Figure 4:
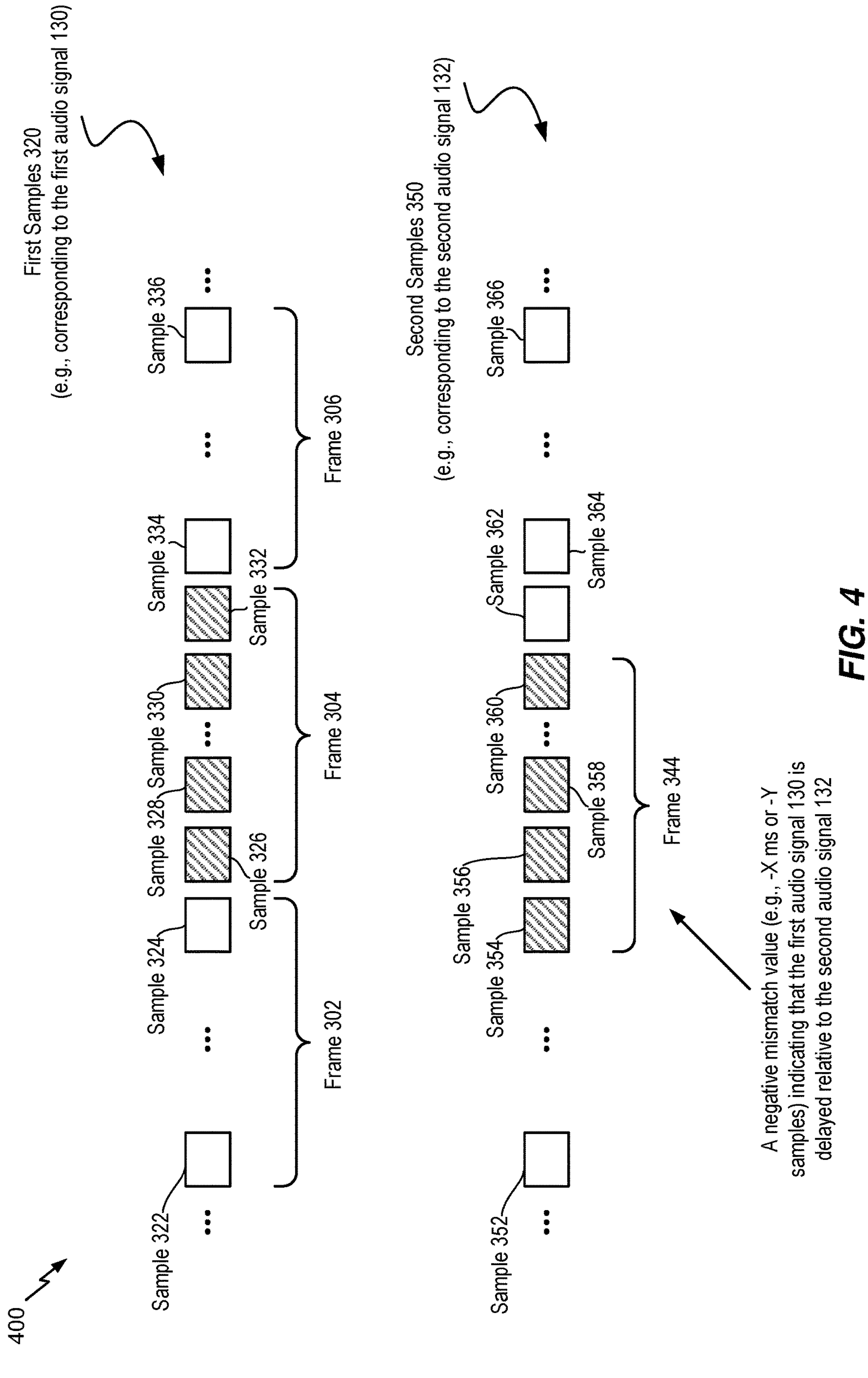
FIG. 4 is a diagram illustrating particular examples of samples that may be encoded by the device of FIG. 1.

Referring to FIG. 4, illustrative examples of samples are shown and generally designated as 400. The examples 400 differ from the examples 300 in that the first audio signal 130 is delayed relative to the second audio signal 132.

A second value (e.g., a negative value) of the final mismatch value 116 may indicate that the first audio signal 130 is delayed relative to the second audio signal 132. For example, the second value (e.g., –X ms or –Y samples, where X and Y include positive real numbers) of the final mismatch value 116 may indicate that the frame 304 (e.g., the samples 326-332) correspond to the samples 354-360. The samples 354-360 may correspond to the frame 344 of the second audio signal 132. The samples 354-360 (e.g., the frame 344) and the samples 326-332 (e.g., the frame 304) may correspond to the same sound emitted from the sound source 152.

It should be understood that a temporal offset of −Y samples, as shown in FIG. 4, is illustrative. For example, the temporal offset may correspond to a number of samples, −Y, that is less than or equal to 0. In a first case where the temporal offset Y=0 samples, the samples 326-332 (e.g., corresponding to the frame 304) and the samples 356-362 (e.g., corresponding to the frame 344) may show high similarity without any frame offset. In a second case where the temporal offset Y=−6 samples, the frame 304 and frame 344 may be offset by 6 samples. In this case, the first audio signal 130 may be received subsequent to the second audio signal 132 at the input interface(s) 112 by Y=−6 samples or X=(−6/Fs) ms, where Fs corresponds to the sample rate in kHz. In some cases, the temporal offset, Y, may include a non-integer value, e.g., Y=−3.2 samples corresponding to X=−0.1 ms at 32 kHz.

The temporal equalizer 108 of FIG. 1 may generate the encoded signals 102 by encoding the samples 354-360 and the samples 326-332, as described with reference to FIG. 1. The temporal equalizer 108 may determine that the second audio signal 132 corresponds to a reference signal and that the first audio signal 130 corresponds to a target signal. In particular, the temporal equalizer 108 may estimate the non-causal mismatch value 162 from the final mismatch value 116, as described with reference to FIG. 5. The temporal equalizer 108 may identify (e.g., designate) one of the first audio signal 130 or the second audio signal 132 as a reference signal and the other of the first audio signal 130 or the second audio signal 132 as a target signal based on a sign of the final mismatch value 116.

Figure 5:
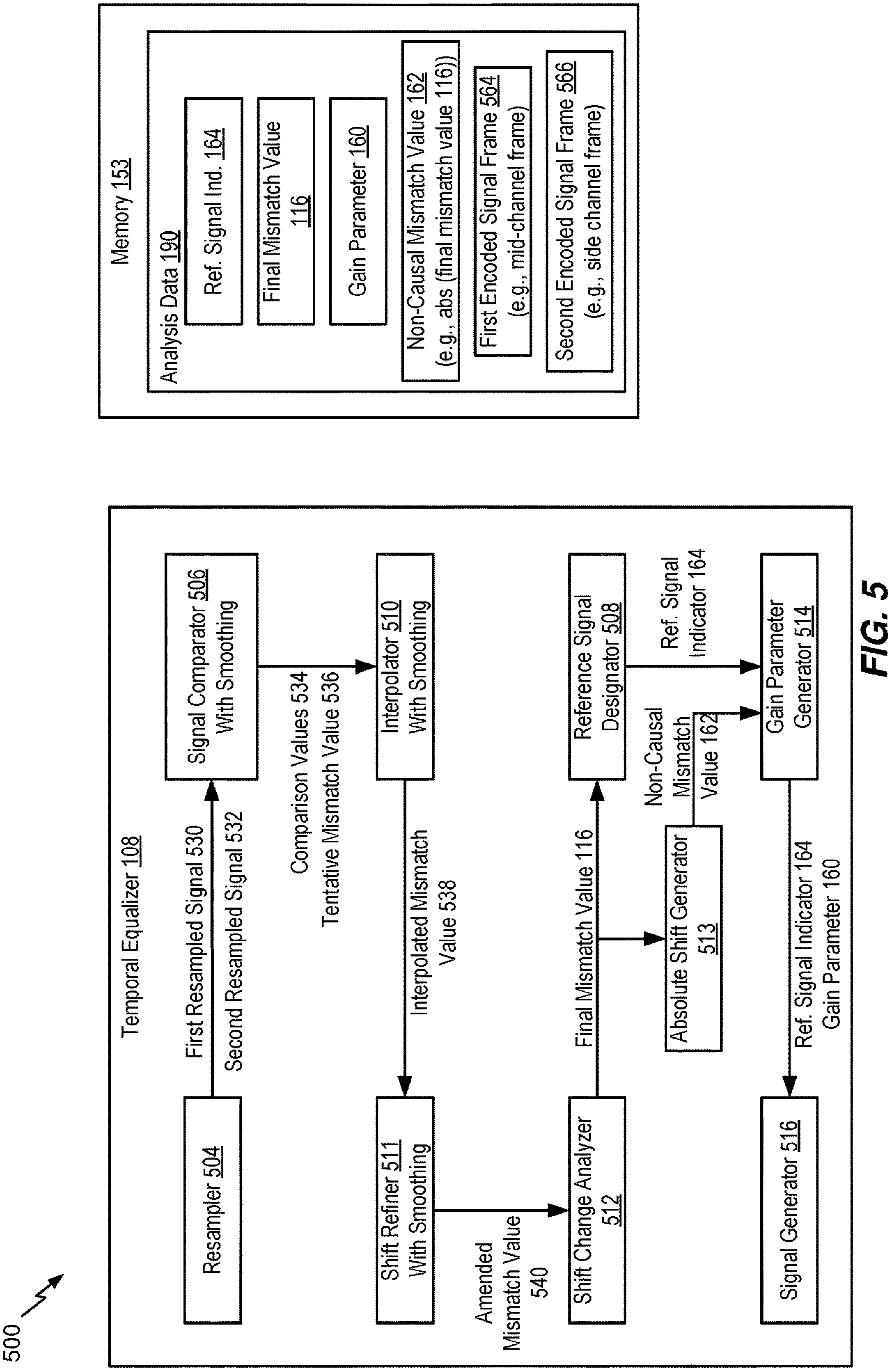
FIG. 5 is a diagram illustrating a particular example of a temporal equalizer and a memory.

Referring to FIG. 5, an illustrative example of a temporal equalizer and a memory is shown and generally designated 500. The system 500 may be integrated into the system 100 of FIG. 1. For example, the system 100, the first device 104 of FIG. 1, or both, may include one or more components of the system 500. The temporal equalizer 108 may include a resampler 504, a signal comparator 506, an interpolator 510, a shift refiner 511, a shift change analyzer 512, an absolute shift generator 513, a reference signal designator 508, a gain parameter generator 514, a signal generator 516, or a combination thereof.

During operation, the resampler 504 may generate one or more resampled signals. For example, the resampler 504 may generate a first resampled signal 530 by resampling (e.g., down-sampling or up-sampling) the first audio signal 130 based on a resampling (e.g., down-sampling or up-sampling) factor (D) (e.g., ≥1). The resampler 504 may generate a second resampled signal 532 by resampling the second audio signal 132 based on the resampling factor (D). The resampler 504 may provide the first resampled signal 530, the second resampled signal 532, or both, to the signal comparator 506. The first audio signal 130 may be sampled at a first sample rate (Fs) to generate the samples 320 of FIG. 3. The first sample rate (Fs) may correspond to a first rate (e.g., 16 kilohertz (kHz)) associated with wideband (WB) bandwidth, a second rate (e.g., 32 kHz) associated with super wideband (SWB) bandwidth, a third rate (e.g., 48 kHz) associated with full band (FB) bandwidth, or another rate. The second audio signal 132 may be sampled at the first sample rate (Fs) to generate the second samples 350 of FIG. 3.

The signal comparator 506 may generate comparison values 534 (e.g., difference values, similarity values, coherence values, or cross-correlation values), a tentative mismatch value 536, or both, as further described with reference to FIG. 6. For example, the signal comparator 506 may generate the comparison values 534 based on the first resampled signal 530 and a plurality of mismatch values applied to the second resampled signal 532, as further described with reference to FIG. 6. The signal comparator 506 may determine the tentative mismatch value 536 based on the comparison values 534, as further described with reference to FIG. 6. According to one implementation, the signal comparator 506 may retrieve comparison values for previous frames of the resampled signals 530, 532 and may modify the comparison values 534 based on a long-term smoothing operation using the comparison values for previous frames. For example, the comparison values 534 may include the long-term smoothed comparison value $CompVal_{LT_N}(k)$ for a current frame (N) and may be represented by $CompVal_{LT_N}(k)=(1-\alpha)*CompVal_N(k)+(a)*CompVal_{LT_{N-1}}(k)$, where $\alpha \in (0, 1.0)$. Thus, the long-term smoothed comparison value $CompVal_{LT_N}(k)$ may be based on a weighted mixture of the instantaneous comparison value $CompVal_N(k)$ at frame N and the long-term smoothed comparison values $CompVal_{LT_{N-1}}(k)$ for one or more previous frames. As the value of α increases, the amount of smoothing in the long-term smoothed comparison value increases. The smoothing parameters (e.g., the value of the a) may be controlled/adapted to limit the smoothing of comparison values during silence portions (or during background noise which may cause drift in the shift estimation). For example, the comparison values may be smoothed based on a higher smoothing factor (e.g., α=0.995); otherwise the smoothing can be based on α=0.9. The control of the smoothing parameters (e.g., a) may be based on whether the background energy or long-term energy is below a threshold, based on a coder type, or based on comparison value statistics.

In a particular implementation, the value of the smoothing parameters (e.g., α) may be based on the short-term signal level ($E_{ST}$) and the long-term signal level ($E_{LT}$) of the channels. As an example, the short-term signal level may be calculated for the frame (N) being processed ($E_{ST}(N)$) as the sum of the sum of the absolute values of the downsampled reference samples and the sum of the absolute values of the downsampled target samples. The long-term signal level may be a smoothed version of the short-term signal levels. For example, $E_{LT}(N)=0.6*E_{LT}(N-1)+0.4*E_{ST}(N)$. Further, the value of the smoothing parameters (e.g., α) may be controlled according to a pseudo-code described as follows Set α to an initial value (e.g., 0.95).

if $E_{ST}>4*E_{LT}$, modify the value of α (e.g., α=0.5)

if $E_{ST}>2*E_{LT}$ and $E_{ST}\leq 4*E_{LT}$, modify the value of α (e.g., α=0.7)

In a particular implementation, the value of the smoothing parameters (e.g., α) may be controlled based on the correlation of the short-term and the long-term smoothed comparison values. For example, when the comparison values of the current frame are very similar to the long-term smoothed comparison values, it is an indication of a stationary talker and this could be used to control the smoothing parameters to further increase the smoothing (e.g., increase the value of α). On the other hand, when the comparison values as a function of the various shift values does not resemble the long-term smoothed comparison values, the smoothing parameters can be adjusted (e.g., adapted) to reduce smoothing (e.g., decrease the value of α).

In a particular implementation, the signal comparator 506 may estimate short-term smoothed comparison values ($CompVal_{ST_N}(k)$) by smoothing the comparison values of the frames in vicinity of the current frame being processed. Ex:

$$CompVal_{ST_N}(k) = \frac{(CompVal_N(k) + CompVal_{N-1}(k) + CompVal_{N-2}(k))}{3}.$$

In other implementations, the short-term smoothed comparison values may be the same as the comparison values generated in the frame being processed ($CompVal_N(k)$).

The signal comparator 506 may estimate a cross-correlation value of the short-term and the long-term smoothed comparison values. In some implementations, the cross-correlation value ($CrossCorr\_CompVal_N$) of the short-term and the long-term smoothed comparison values may be a single value estimated per each frame (N) which is calculated as $CrossCorr\_CompVal_N=(\Sigma_k CompVal_{ST_N}(k)*CompVal_{LT_{N-1}}(k))/Fac$. Where 'Fac' is a normalization factor chosen such that the $CrossCorr\_CompVal_N$ is restricted between 0 and 1. As a non-limiting example, Fac may be calculated as:

$$Fac = \sqrt{\left(\sum_k CompVal_{ST_N}(k) * CompVal_{ST_N}(k)\right) * \left(\sum_k CompVal_{LT_{N-1}}(k) * CompVal_{LT_{N-1}}(k)\right)}.$$

The signal comparator 506 may estimate another cross-correlation value of the comparison values for a single frame ("instantaneous comparison values") and short-term smoothed comparison values. In some implementations, the cross-correlation value ($CrossCorr\_CompVal_N$) of the comparison values for the frame N ("instantaneous comparison values for the frame N") and the short-term smoothed comparison values (e.g., $CompVal_{ST_N}(k)$) may be a single value estimated per each frame (N) which is calculated as $CrossCorr\_CompVal_N=(\Sigma_k CompVal_{ST_N}(k)*CompVal_N(k))/Fac$. Where 'Fac' is a normalization factor chosen such that the $CrossCorr\_CompVal_N$ is restricted between 0 and 1. As a non-limiting example, Fac may be calculated as:

$$Fac = \sqrt{\left(\sum_k CompVal_{ST_N}(k) * CompVal_{ST_N}(k)\right) * \left(\sum_k CompVal_N(k) * CompVal_N(k)\right)}.$$

The first resampled signal 530 may include fewer samples or more samples than the first audio signal 130. The second resampled signal 532 may include fewer samples or more samples than the second audio signal 132. Determining the comparison values 534 based on the fewer samples of the resampled signals (e.g., the first resampled signal 530 and the second resampled signal 532) may use fewer resources (e.g., time, number of operations, or both) than on samples of the original signals (e.g., the first audio signal 130 and the second audio signal 132). Determining the comparison values 534 based on the more samples of the resampled signals (e.g., the first resampled signal 530 and the second resampled signal 532) may increase precision than on samples of the original signals (e.g., the first audio signal 130 and the second audio signal 132). The signal comparator 506 may provide the comparison values 534, the tentative mismatch value 536, or both, to the interpolator 510.

The interpolator 510 may extend the tentative mismatch value 536. For example, the interpolator 510 may generate an interpolated mismatch value 538. For example, the interpolator 510 may generate interpolated comparison values corresponding to mismatch values that are proximate to the tentative mismatch value 536 by interpolating the comparison values 534. The interpolator 510 may determine the interpolated mismatch value 538 based on the interpolated comparison values and the comparison values 534. The comparison values 534 may be based on a coarser granularity of the mismatch values. For example, the comparison values 534 may be based on a first subset of a set of mismatch values so that a difference between a first mismatch value of the first subset and each second mismatch value of the first subset is greater than or equal to a threshold (e.g., ≥1). The threshold may be based on the resampling factor (D).

The interpolated comparison values may be based on a finer granularity of mismatch values that are proximate to the resampled tentative mismatch value 536. For example, the interpolated comparison values may be based on a second subset of the set of mismatch values so that a difference between a highest mismatch value of the second subset and the resampled tentative mismatch value 536 is less than the threshold (e.g., ≥1), and a difference between a lowest mismatch value of the second subset and the resampled tentative mismatch value 536 is less than the threshold. Determining the comparison values 534 based on the coarser granularity (e.g., the first subset) of the set of mismatch values may use fewer resources (e.g., time, operations, or both) than determining the comparison values 534 based on a finer granularity (e.g., all) of the set of mismatch values. Determining the interpolated comparison values corresponding to the second subset of mismatch values may extend the tentative mismatch value 536 based on a finer granularity of a smaller set of mismatch values that are proximate to the tentative mismatch value 536 without determining comparison values corresponding to each mismatch value of the set of mismatch values. Thus, determining the tentative mismatch value 536 based on the first subset of mismatch values and determining the interpolated mismatch value 538 based on the interpolated comparison values may balance resource usage and refinement of the estimated mismatch value. The interpolator 510 may provide the interpolated mismatch value 538 to the shift refiner 511.

According to one implementation, the interpolator 510 may retrieve interpolated mismatch/comparison values for previous frames and may modify the interpolated mismatch/comparison value 538 based on a long-term smoothing operation using the interpolated mismatch/comparison values for previous frames. For example, the interpolated mismatch/comparison value 538 may include a long-term interpolated mismatch/comparison value $InterVal_{LT_N}(k)$ for a current frame (N) and may be represented by $\text{InterVal}_{LT_N}(k)=(1-\alpha)*\text{InterVal}_N(k)+(a)*\text{InterVal}_{LT_{N-1}}(k)$, where $\alpha\in(0, 1.0)$. Thus, the long-term interpolated mismatch/comparison value $\text{InterVal}_{LT_N}(k)$ may be based on a weighted mixture of the instantaneous interpolated mismatch/comparison value $\text{InterVal}_N(k)$ at frame N and the long-term interpolated mismatch/comparison values $\text{InterVal}_{LT_{N-1}}(k)$ for one or more previous frames. As the value of α increases, the amount of smoothing in the long-term smoothed comparison value increases.

The shift refiner 511 may generate an amended mismatch value 540 by refining the interpolated mismatch value 538. For example, the shift refiner 511 may determine whether the interpolated mismatch value 538 indicates that a change in a shift between the first audio signal 130 and the second audio signal 132 is greater than a shift change threshold. The change in the shift may be indicated by a difference between the interpolated mismatch value 538 and a first mismatch value associated with the frame 302 of FIG. 3. The shift refiner 511 may, in response to determining that the difference is less than or equal to the threshold, set the amended mismatch value 540 to the interpolated mismatch value 538. Alternatively, the shift refiner 511 may, in response to determining that the difference is greater than the threshold, determine a plurality of mismatch values that correspond to a difference that is less than or equal to the shift change threshold. The shift refiner 511 may determine comparison values based on the first audio signal 130 and the plurality of mismatch values applied to the second audio signal 132. The shift refiner 511 may determine the amended mismatch value 540 based on the comparison values. For example, the shift refiner 511 may select a mismatch value of the plurality of mismatch values based on the comparison values and the interpolated mismatch value. The shift refiner 511 may set the amended mismatch value 540 to indicate the selected mismatch value. A non-zero difference between the first mismatch value corresponding to the frame 302 and the interpolated mismatch value 538 may indicate that some samples of the second audio signal 132 correspond to both frames (e.g., the frame 302 and the frame 304). For example, some samples of the second audio signal 132 may be duplicated during encoding. Alternatively, the non-zero difference may indicate that some samples of the second audio signal 132 correspond to neither the frame 302 nor the frame 304. For example, some samples of the second audio signal 132 may be lost during encoding. Setting the amended mismatch value 540 to one of the plurality of mismatch values may prevent a large change in shifts between consecutive (or adjacent) frames, thereby reducing an amount of sample loss or sample duplication during encoding. The shift refiner 511 may provide the amended mismatch value 540 to the shift change analyzer 512. In some implementations, the shift refiner 511 may adjust the interpolated mismatch value 538. The shift refiner 511 may determine the amended mismatch value 540 based on the adjusted interpolated mismatch value 538.

According to one implementation, the shift refiner may retrieve amended mismatch values for previous frames and may modify the amended mismatch value 540 based on a long-term smoothing operation using the amended mismatch values for previous frames. For example, the amended mismatch value 540 may include a long-term amended mismatch value $\text{AmendVal}_{LT_N}(k)$ for a current frame (N) and may be represented by $\text{AmendVal}_{LT_N}(k)=(1-\alpha)*\text{AmendVal}_N(k)+(a)*\text{AmendVal}_{LT_{N-1}}(k)$, where $\alpha\in(0, 1.0)$. Thus, the long-term amended mismatch value $\text{AmendVal}_{LT_N}(k)$ may be based on a weighted mixture of the instantaneous amended mismatch value $\text{AmendVal}_N(k)$ at frame N and the long-term amended mismatch values $\text{AmendVal}_{LT_{N-1}}(k)$ for one or more previous frames. As the value of α increases, the amount of smoothing in the long-term smoothed comparison value increases.

The shift change analyzer 512 may determine whether the amended mismatch value 540 indicates a switch or reverse in timing between the first audio signal 130 and the second audio signal 132, as described with reference to FIG. 1. In particular, a reverse or a switch in timing may indicate that, for the frame 302, the first audio signal 130 is received at the input interface(s) 112 prior to the second audio signal 132, and, for a subsequent frame (e.g., the frame 304 or the frame 306), the second audio signal 132 is received at the input interface(s) prior to the first audio signal 130. Alternatively, a reverse or a switch in timing may indicate that, for the frame 302, the second audio signal 132 is received at the input interface(s) 112 prior to the first audio signal 130, and, for a subsequent frame (e.g., the frame 304 or the frame 306), the first audio signal 130 is received at the input interface(s) prior to the second audio signal 132. In other words, a switch or reverse in timing may be indicate that a final mismatch value corresponding to the frame 302 has a first sign that is distinct from a second sign of the amended mismatch value 540 corresponding to the frame 304 (e.g., a positive to negative transition or vice-versa). The shift change analyzer 512 may determine whether delay between the first audio signal 130 and the second audio signal 132 has switched sign based on the amended mismatch value 540 and the first mismatch value associated with the frame 302. The shift change analyzer 512 may, in response to determining that the delay between the first audio signal 130 and the second audio signal 132 has switched sign, set the final mismatch value 116 to a value (e.g., 0) indicating no time shift. Alternatively, the shift change analyzer 512 may set the final mismatch value 116 to the amended mismatch value 540 in response to determining that the delay between the first audio signal 130 and the second audio signal 132 has not switched sign. The shift change analyzer 512 may generate an estimated mismatch value by refining the amended mismatch value 540. The shift change analyzer 512 may set the final mismatch value 116 to the estimated mismatch value. Setting the final mismatch value 116 to indicate no time shift may reduce distortion at a decoder by refraining from time shifting the first audio signal 130 and the second audio signal 132 in opposite directions for consecutive (or adjacent) frames of the first audio signal 130. The shift change analyzer 512 may provide the final mismatch value 116 to the reference signal designator 508, to the absolute shift generator 513, or both.

The absolute shift generator 513 may generate the non-causal mismatch value 162 by applying an absolute function to the final mismatch value 116. The absolute shift generator 513 may provide the mismatch value 162 to the gain parameter generator 514.

The reference signal designator 508 may generate the reference signal indicator 164. For example, the reference signal indicator 164 may have a first value indicating that the first audio signal 130 is a reference signal or a second value indicating that the second audio signal 132 is the reference signal. The reference signal designator 508 may provide the reference signal indicator 164 to the gain parameter generator 514.

The reference signal designator 508 may further determine whether the final mismatch value 116 is equal to 0. For example, the reference signal designator 508 may, in response to determining that the final mismatch value 116 has the particular value (e.g., 0) indicating no time shift, leave the reference signal indicator 164 unchanged. To illustrate, the reference signal indicator 164 may indicate that the same audio signal (e.g., the first audio signal 130 or the second audio signal 132) is a reference signal associated with the frame 304 as with the frame 302.

The reference signal designator 508 may further determine that the final mismatch value 116 is non-zero, at 1202, determining whether the final mismatch value 116 is greater than 0, at 1206. For example, the reference signal designator 508 may, in response to determining that the final mismatch value 116 has a particular value (e.g., a non-zero value) indicating a time shift, determine whether the final mismatch value 116 has a first value (e.g., a positive value) indicating that the second audio signal 132 is delayed relative to the first audio signal 130 or a second value (e.g., a negative value) indicating that the first audio signal 130 is delayed relative to the second audio signal 132.

The gain parameter generator 514 may select samples of the target signal (e.g., the second audio signal 132) based on the non-causal mismatch value 162. To illustrate, the gain parameter generator 514 may select the samples 358-364 in response to determining that the non-causal mismatch value 162 has a first value (e.g., +X ms or +Y samples, where X and Y include positive real numbers). The gain parameter generator 514 may select the samples 354-360 in response to determining that the non-causal mismatch value 162 has a second value (e.g., −X ms or −Y samples). The gain parameter generator 514 may select the samples 356-362 in response to determining that the non-causal mismatch value 162 has a value (e.g., 0) indicating no time shift.

The gain parameter generator 514 may determine whether the first audio signal 130 is the reference signal or the second audio signal 132 is the reference signal based on the reference signal indicator 164. The gain parameter generator 514 may generate the gain parameter 160 based on the samples 326-332 of the frame 304 and the selected samples (e.g., the samples 354-360, the samples 356-362, or the samples 358-364) of the second audio signal 132, as described with reference to FIG. 1. For example, the gain parameter generator 514 may generate the gain parameter 160 based on one or more of Equation 1a-Equation 1f, where $g_D$ corresponds to the gain parameter 160, Ref(n) corresponds to samples of the reference signal, and Targ(n+$N_1$) corresponds to samples of the target signal. To illustrate, Ref(n) may correspond to the samples 326-332 of the frame 304 and Targ(n+$t_{N1}$) may correspond to the samples 358-364 of the frame 344 when the non-causal mismatch value 162 has a first value (e.g., +X ms or +Y samples, where X and Y include positive real numbers). In some implementations, Ref(n) may correspond to samples of the first audio signal 130 and Targ(n+$N_1$) may correspond to samples of the second audio signal 132, as described with reference to FIG. 1. In alternate implementations, Ref(n) may correspond to samples of the second audio signal 132 and Targ(n+$N_1$) may correspond to samples of the first audio signal 130, as described with reference to FIG. 1.

The gain parameter generator 514 may provide the gain parameter 160, the reference signal indicator 164, the non-causal mismatch value 162, or a combination thereof, to the signal generator 516. The signal generator 516 may generate the encoded signals 102, as described with reference to FIG. 1. For examples, the encoded signals 102 may include a first encoded signal frame 564 (e.g., a mid channel frame), a second encoded signal frame 566 (e.g., a side channel frame), or both. The signal generator 516 may generate the first encoded signal frame 564 based on Equation 2a or Equation 2b, where M corresponds to the first encoded signal frame 564, $g_D$ corresponds to the gain parameter 160, Ref(n) corresponds to samples of the reference signal, and Targ(n+$N_1$) corresponds to samples of the target signal. The signal generator 516 may generate the second encoded signal frame 566 based on Equation 3a or Equation 3b, where S corresponds to the second encoded signal frame 566, $g_D$ corresponds to the gain parameter 160, Ref(n) corresponds to samples of the reference signal, and Targ(n+$N_1$) corresponds to samples of the target signal.

The temporal equalizer 108 may store the first resampled signal 530, the second resampled signal 532, the comparison values 534, the tentative mismatch value 536, the interpolated mismatch value 538, the amended mismatch value 540, the non-causal mismatch value 162, the reference signal indicator 164, the final mismatch value 116, the gain parameter 160, the first encoded signal frame 564, the second encoded signal frame 566, or a combination thereof, in the memory 153. For example, the analysis data 190 may include the first resampled signal 530, the second resampled signal 532, the comparison values 534, the tentative mismatch value 536, the interpolated mismatch value 538, the amended mismatch value 540, the non-causal mismatch value 162, the reference signal indicator 164, the final mismatch value 116, the gain parameter 160, the first encoded signal frame 564, the second encoded signal frame 566, or a combination thereof.

The smoothing techniques described above may substantially normalize the shift estimate between voiced frames, unvoiced frames, and transition frames. Normalized shift estimates may reduce sample repetition and artifact skipping at frame boundaries. Additionally, normalized shift estimates may result in reduced side channel energies, which may improve coding efficiency.

Figure 6:
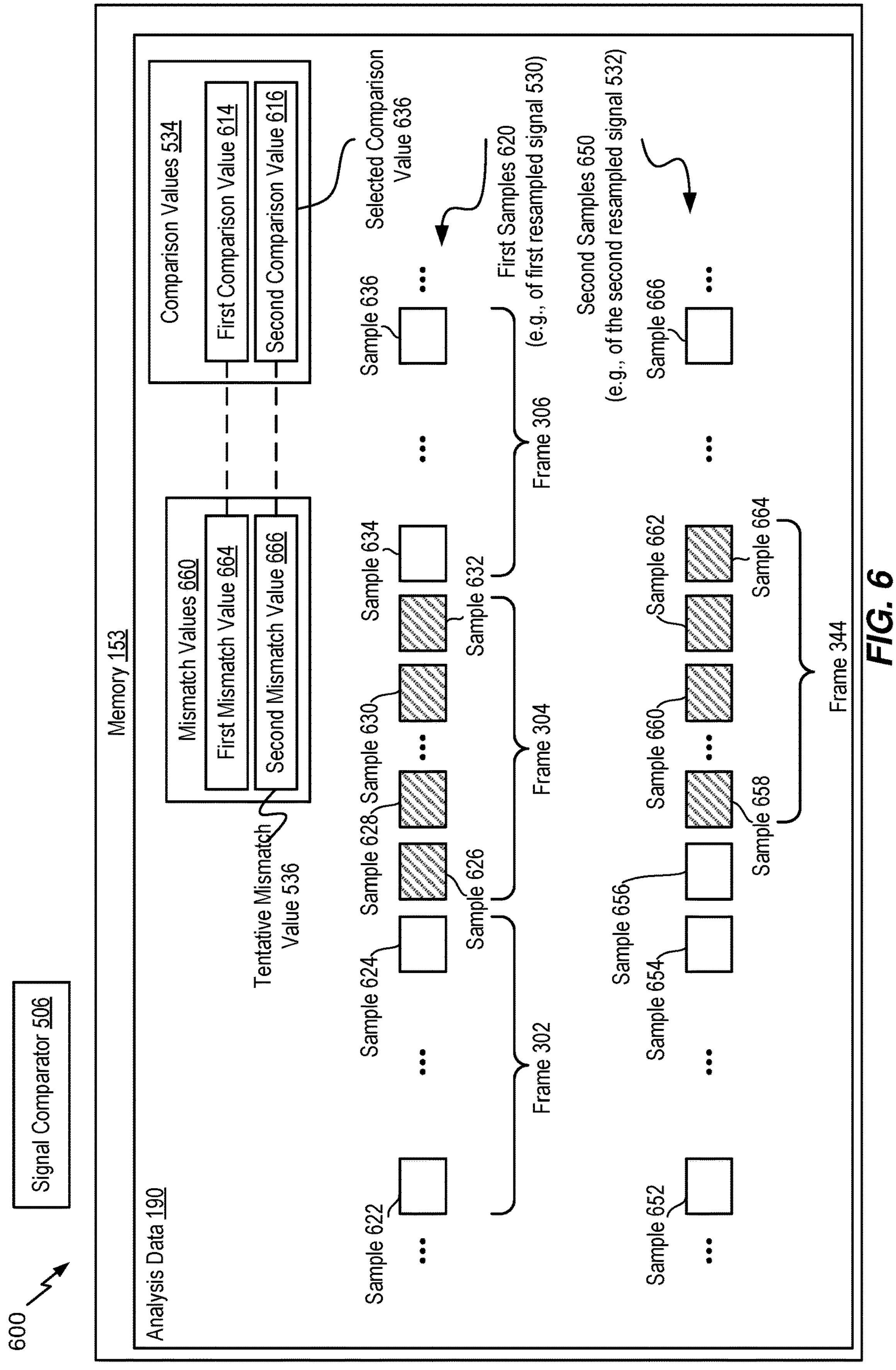
FIG. 6 is a diagram illustrating a particular example of a signal comparator.

Referring to FIG. 6, an illustrative example of a system including a signal comparator is shown and generally designated 600. The system 600 may correspond to the system 100 of FIG. 1. For example, the system 100, the first device 104 of FIG. 1, or both, may include one or more components of the system 700.

The memory 153 may store a plurality of mismatch values 660. The mismatch values 660 may include a first mismatch value 664 (e.g., −X ms or −Y samples, where X and Y include positive real numbers), a second mismatch value 666 (e.g., +X ms or +Y samples, where X and Y include positive real numbers), or both. The mismatch values 660 may range from a lower mismatch value (e.g., a minimum mismatch value, T_MIN) to a higher mismatch value (e.g., a maximum mismatch value, T_MAX). The mismatch values 660 may indicate an expected temporal shift (e.g., a maximum expected temporal shift) between the first audio signal 130 and the second audio signal 132.

During operation, the signal comparator 506 may determine the comparison values 534 based on the first samples 620 and the mismatch values 660 applied to the second samples 650. For example, the samples 626-632 may correspond to a first time (t). To illustrate, the input interface(s) 112 of FIG. 1 may receive the samples 626-632 corresponding to the frame 304 at approximately the first time (t). The first mismatch value 664 (e.g., −X ms or −Y samples, where X and Y include positive real numbers) may correspond to a second time (t−1).

The samples 654-660 may correspond to the second time (t−1). For example, the input interface(s) 112 may receive the samples 654-660 at approximately the second time (t−1). The signal comparator 506 may determine a first comparison value 614 (e.g., a difference value or a cross-correlation value) corresponding to the first mismatch value 664 based on the samples 626-632 and the samples 654-660. For example, the first comparison value 614 may correspond to an absolute value of cross-correlation of the samples 626-632 and the samples 654-660. As another example, the first comparison value 614 may indicate a difference between the samples 626-632 and the samples 654-660.

The second mismatch value 666 (e.g., +X ms or +Y samples, where X and Y include positive real numbers) may correspond to a third time (t+1). The samples 658-664 may correspond to the third time (t+1). For example, the input interface(s) 112 may receive the samples 658-664 at approximately the third time (t+1). The signal comparator 506 may determine a second comparison value 616 (e.g., a difference value or a cross-correlation value) corresponding to the second mismatch value 666 based on the samples 626-632 and the samples 658-664. For example, the second comparison value 616 may correspond to an absolute value of cross-correlation of the samples 626-632 and the samples 658-664. As another example, the second comparison value 616 may indicate a difference between the samples 626-632 and the samples 658-664. The signal comparator 506 may store the comparison values 534 in the memory 153. For example, the analysis data 190 may include the comparison values 534.

The signal comparator 506 may identify a selected comparison value 636 of the comparison values 534 that has a higher (or lower) value than other values of the comparison values 534. For example, the signal comparator 506 may select the second comparison value 616 as the selected comparison value 636 in response to determining that the second comparison value 616 is greater than or equal to the first comparison value 614. In some implementations, the comparison values 534 may correspond to cross-correlation values. The signal comparator 506 may, in response to determining that the second comparison value 616 is greater than the first comparison value 614, determine that the samples 626-632 have a higher correlation with the samples 658-664 than with the samples 654-660. The signal comparator 506 may select the second comparison value 616 that indicates the higher correlation as the selected comparison value 636. In other implementations, the comparison values 534 may correspond to difference values. The signal comparator 506 may, in response to determining that the second comparison value 616 is lower than the first comparison value 614, determine that the samples 626-632 have a greater similarity with (e.g., a lower difference to) the samples 658-664 than the samples 654-660. The signal comparator 506 may select the second comparison value 616 that indicates a lower difference as the selected comparison value 636.

The selected comparison value 636 may indicate a higher correlation (or a lower difference) than the other values of the comparison values 534. The signal comparator 506 may identify the tentative mismatch value 536 of the mismatch values 660 that corresponds to the selected comparison value 636. For example, the signal comparator 506 may identify the second mismatch value 666 as the tentative mismatch value 536 in response to determining that the second mismatch value 666 corresponds to the selected comparison value 636 (e.g., the second comparison value 616).

Figure 7:
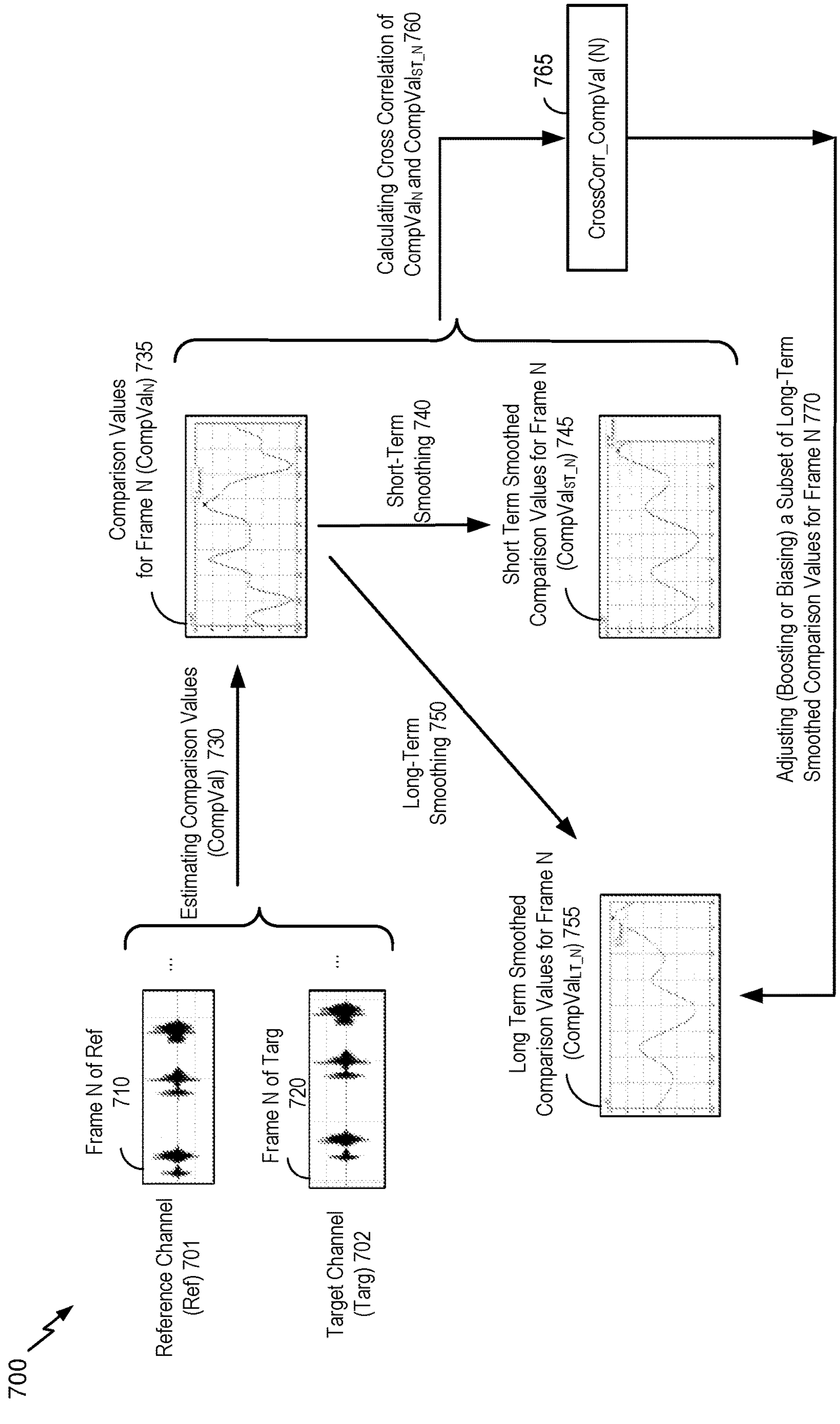
FIG. 7 is a diagram illustrating particular examples of adjusting a subset of long-term smoothed comparison values based on cross correlation value of particular comparison values.

Referring to FIG. 7, illustrative examples of adjusting a subset of long-term smoothed comparison values are shown and generally designated as 700. The example 700 may be performed by the temporal equalizer 108, the encoder 114, the first device 104 of FIG. 1, the temporal equalizer(s) 208, the encoder 214, the first device 204 of FIG. 2, the signal comparator 506 of FIG. 5, or a combination thereof.

The reference channel ("Ref(n)") 701 may correspond to a first audio signal 130 and may include a plurality of reference frames including a frame N 710 of the reference channel 701. The target channel ("Targ(n)") 701 may correspond to a second audio signal 132 and may include a plurality of target frames including a frame N 720 of the target channel 702. The encoder 114 or temporal equalizer 108 may estimate comparison values 730 for the frame N 710 of the reference channel 701 and for the frame N 720 of the target channel 702. Each comparison value may be indicative of an amount of temporal mismatch, or a measure of the similarity or dissimilarity between the reference frame N 710 of the reference channel 701 and a corresponding target frame N 720 of a target channel 702. In some implementations, cross-correlation values between the reference frame and the target frame may be used to measure the similarity of the two frames as a function of the lag of one frame relative to the other. For example, the comparison values for frame N ($CompVal_N(k)$) 735 may be the cross-correlation values between the frame N 710 of the reference channel and the frame N 720 of the target channel.

The encoder 114 or temporal equalizer 108 may smooth the comparison values to generate short-term smoothed comparison values. The short-term smoothed comparison values (e.g., $CompVal_{ST_N}(k)$ for frame N) may be estimated as a smoothed version of the comparison values of the frames in vicinity of the frame N710 720. To illustrate, the short-term comparison values may be generated as a linear combination of a plurality of comparison values from current frame (frame N) and previous frames $$\left(\text{e.g., } CompVal_{ST_N}(k) = \frac{(CompVal_N(k) + CompVal_{N-1}(k) + CompVal_{N-2}(k))}{3}\right).$$

In alternative implementations, a non-uniform weighting may be applied to the plurality of comparison values for the frame N and previous frames.

The encoder 114 or temporal equalizer 108 may smooth the comparison values to generate first long-term smoothed comparison values 755 for the frame N based on a smoothing parameter. The smoothing may be performed such that first long-term smoothed comparison values $CompVal_{LT_N}(k)$ (e.g., the first long-term smoothed comparison values 755) is represented by $CompVal_{LT_N}(k)=f(CompVal_N(k), CompVal_{N-1}(k), CompVal_{LT_{N-2}}(k), \ldots)$. The function ƒ in the above equation may be a function of all (or a subset) of past comparison values at the shift (k). An alternative representation of the may be $CompVal_{LT_N}(k)=g(CompVal_N(k), CompVal_{N-1}(k), CompVal_{N-2}(k), \ldots)$. The functions ƒ or g may be simple finite impulse response (FIR) filters or infinite impulse response (IIR) filters, respectively. For example, the function g may be a single tap IIR filter such that the first long-term smoothed comparison values 755 is represented by $CompVal_{LT_N}(k)=(1-\alpha)*CompVal_N(k)+(a)*CompVal_{LT_{N-1}}(k)$, where $\alpha\in(0, 1.0)$. Thus, the long-term smoothed comparison values $CompVal_{LT_N}(k)$ may be based on a weighted mixture of the instantaneous comparison values $CompVal_N(k)$ for the frame N 710 720 and the long-term smoothed comparison values $CompVal_{LT_{N-1}}(k)$ for one or more previous frames.

The encoder 114 or temporal equalizer 108 may calculate a cross-correlation value of the comparison values and the short-term smoothed comparison values. For example, the encoder 114 or temporal equalizer 108 may calculate a cross-correlation value ($CrossCorr\_CompVal_N$) 765 of the comparison values $CompVal_N(k)$ 735 for the frame N 710 720 and short-term smoothed comparison values $CompVal_{ST_N}(k)$ 745 for the frame N 710 720. In some implementations, the cross-correlation value ($CrossCorr\_CompVal_N$) 765 may be a single value estimated which is calculated as $CrossCorr\_CompVal_N=(\Sigma_k CompVal_{ST_N}(k)*CompVal_N(k))/Fac$. Where 'Fac' is a normalization factor chosen such that the $CrossCorr\_CompVal_N$ 765 is restricted between 0 and 1. As a non-limiting example, Fac may be calculated as:

$$Fac=\sqrt{\left(\sum_k CompVal_{ST_N}(k)*CompVal_{ST_N}(k)\right)*\left(\sum_k CompVal_N(k)*CompVal_N(k)\right)}.$$

Alternatively, the encoder 114 or temporal equalizer 108 may calculate a cross-correlation value of the short-term and the long-term smoothed comparison values. In some implementations, the cross-correlation value ($CrossCorr\_CompVal_N$) 765 of the short-term smoothed comparison values $CompVal_{ST_N}(k)$ 745 for the frame N 710 720 and the long-term smoothed comparison values $CompVal_{LT_N}(k)$ 755 for the frame N 710 720 may be a single value which is calculated as $CrossCorr\_CompVal_N=(\Sigma_k CompVal_{ST_N}(k)*CompVal_{LT_{N-1}}(k))/Fac$. Where 'Fac' is a normalization factor chosen such that the $CrossCorr\_CompVal_N$ 765 is restricted between 0 and 1. As a non-limiting example, Fac may be calculated as:

$$Fac=\sqrt{\left(\sum_k CompVal_{ST_N}(k)*CompVal_{ST_N}(k)\right)*\left(\sum_k CompVal_{LT_{N-1}}(k)*CompVal_{LT_{N-1}}(k)\right)}.$$

The encoder 114 or temporal equalizer 108 may compare the cross-correlation value of the comparison values ($CrossCorr\_CompVal_N$) 765 with a threshold, and may adjust a whole or some part of the first long-term smoothed comparison values 755. In some implementations, the encoder 114 or temporal equalizer 108 may increase (or boost or bias) certain values of a subset of the first long-term smoothed comparison values 755 in response to the determination that the cross-correlation value of the comparison values ($CrossCorr\_CompVal_N$) 765 exceeds the threshold. For example, when the cross-correlation value of the comparison values ($CrossCorr\_CompVal_N$) is bigger than or equal to a threshold (e.g., 0.8), it may indicate the cross-correlation value between comparison values is quite strong or high, indicating small or no variations of temporal shift values between adjacent frames. Thus, the estimated temporal shift value of the current frame (e.g., frame N) cannot be too far off from the temporal shift values of the previous frame (e.g., frame N−1) or the temporal shift values of any other previous frames. The temporal shift values may be one of a tentative mismatch value 536, an interpolated mismatch value 538, an amended mismatch value 540, a final mismatch value 116, or a non-causal mismatch value 162. Therefore, the encoder 114 or temporal equalizer 108 may increase (or boost or bias) certain values of a subset of the first long-term smoothed comparison values 755, for example, by a factor of 1.2 (20% boost or increase) to generate a second long-term smoothed comparison values. This boosting or biasing may be implemented by multiplying a scaling factor or by adding an offset to the values within the subset of the first long-term smoothed comparison values 755.

In some implementations, the encoder 114 or temporal equalizer 108 may boost or bias the subset of the first long long-term smoothed comparison values 755 such that the subset may include an index corresponding to the temporal shift value of the previous frame (e.g., frame N−1). Additionally, or alternatively the subset may further include an index around the vicinity of the temporal shift value of the previous frame (e.g., frame N−1). For example, the vicinity may mean within −delta (e.g., delta is in the range of 1-5 samples in a preferred embodiment) and +delta of the temporal shift value of the previous frame (e.g., frame N−1).

Figure 8:
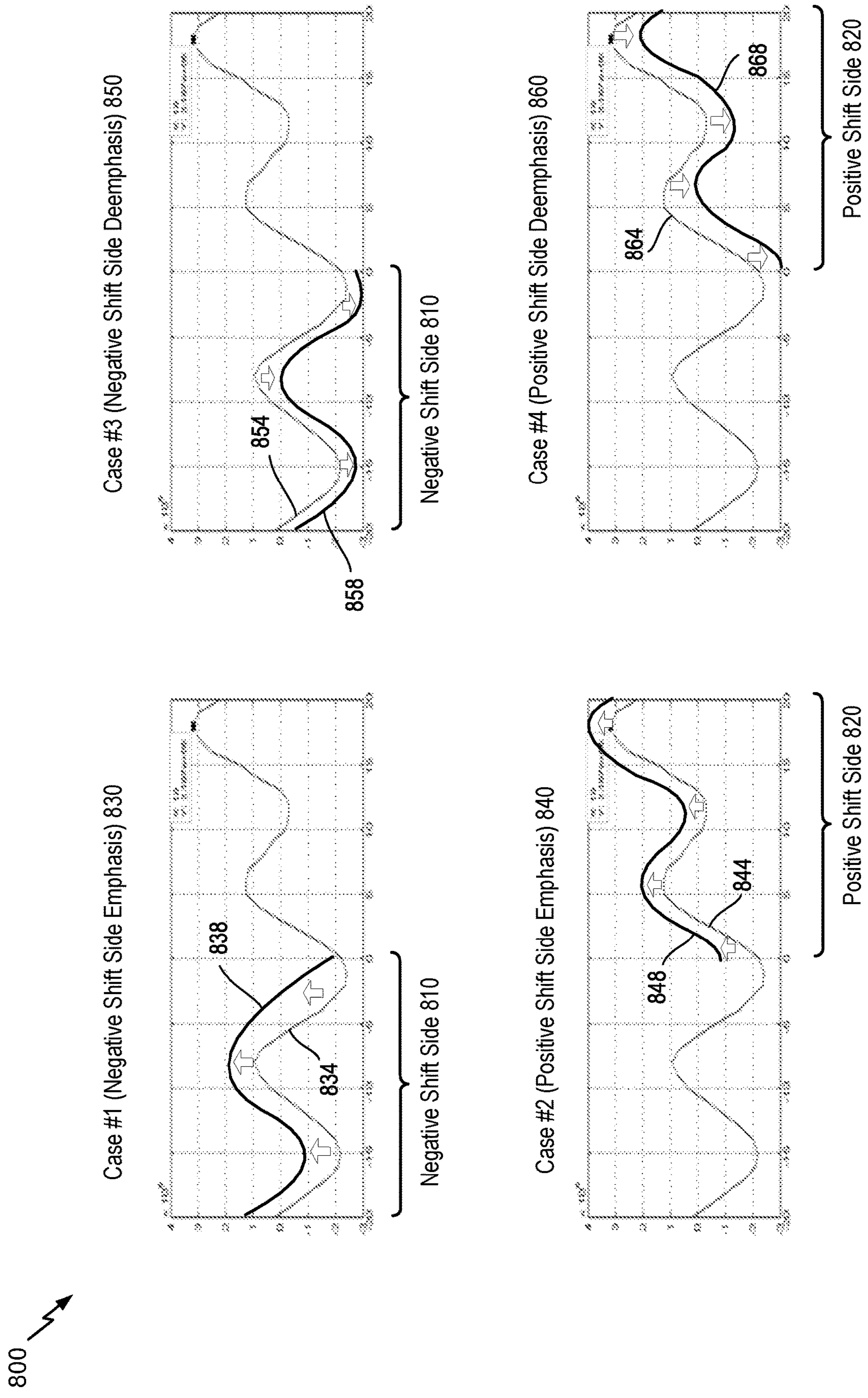
FIG. 8 is a diagram illustrating another particular example of adjusting a subset of long-term smoothed comparison values.

Referring to FIG. 8, illustrative examples of adjusting a subset of long-term smoothed comparison values are shown and generally designated as 800. The example 800 may be performed by the temporal equalizer 108, the encoder 114, the first device 104 of FIG. 1, the temporal equalizer(s) 208, the encoder 214, the first device 204 of FIG. 2, the signal comparator 506 of FIG. 5, or a combination thereof.

The x-axis of the graphs 830 840 850 860 represents negative shift value to positive shift value and the y-axis of the graphs 830 840 850 860 represents comparison values (e.g., cross-correlation values). In some implementation, the y-axis of the graphs 830 840 850 860 in the example 800 may illustrate the long-term smoothed comparison values $CompVal_{LT_N}(k)$ 755 for any particular frame (e.g., frame N) but alternatively it may be the short-term smoothed comparison values $CompVal_{ST_N}(k)$ 745 for any particular frame (e.g., frame N).

The example 800 illustrates cases showing that a subset of the long-term smoothed comparison values (e.g., the first long-term smoothed comparison values $CompVal_{LT_N}(k)$ 755) may be adjusted. Adjusting a subset of the long-term smoothed comparison values in the example 800 may include increasing certain values of the subset of the long-term smoothed comparison values (e.g., the first long-term smoothed comparison values $CompVal_{LT_N}(k)$ 755) by a certain factor. Increasing certain values herein may be referred to as "emphasizing" (or interchangeably "boosting" or "biasing") certain values. Adjusting the subset of the long-term smoothed comparison values in the example 800 may also include decreasing certain values of the subset of the long-term smoothed comparison values (e.g., the first long-term smoothed comparison values $CompVal_{LT_N}(k)$ 755) by a certain factor. Decreasing certain values herein may be referred to as "deemphasizing" certain values.

The Case #1 in FIG. 8 illustrates an example of negative shift side emphasis 830 where certain values of a subset of the long-term smoothed comparison values may be increased (emphasized or boosted or biased) by a certain factor. For example, the encoder 114 or temporal equalizer 108 may increase the values 834 corresponding to the left half of the x-index (a negative shift side 810) of the graph (e.g., the first long-term smoothed comparison values $CompVal_{LT_N}(k)$ 755) by a certain factor (e.g., 1.2, which indicates 20% increase or boosting in values) generating increased values 838. The Case #2 illustrates another example of positive shift side emphasis 840 where certain values of a subset of the long-term smoothed comparison values may be increased (emphasized or boosted or biased) by a certain factor. For example, the encoder 114 or temporal equalizer 108 may increase the values 844 corresponding to the right half of the x-index (a positive shift side 820) of the graph (e.g., the first long-term smoothed comparison values $CompVal_{LT_N}(k)$ 755) by a certain factor (e.g., 1.2, which indicates 20% increase or boosting in values) generating increased values 848.

The Case #3 in FIG. 8 illustrates an example of negative shift side deemphasis 850 where certain values of a subset of the long-term smoothed comparison values may be decreased (or deemphasized) by a certain factor. For example, the encoder 114 or temporal equalizer 108 may decrease the values 854 corresponding to the left half of the x-index (a negative shift side 810) of the graph (e.g., the first long-term smoothed comparison values 755) by a certain factor (e.g., 0.8, which indicates 20% decrease or deemphasis in values) generating decreased values 858. The Case #4 illustrates another example of positive shift side deemphasis 860 where values of a subset of the long-term smoothed comparison values may be decreased (or deemphasized) by a certain factor. For example, the encoder 114 or temporal equalizer 108 may decrease the values 864 corresponding to the right half of the x-index (a positive shift side 820) of the graph (e.g., the first long-term smoothed comparison values 755) by a certain factor (e.g., 0.8, which indicates 20% decrease or deemphasis in values) generating decreased values 868.

Four cases in FIG. 8 are presented only for illustration purpose, and therefore any ranges or values or factors used therein are not meant to be limiting examples. For example, all four cases in FIG. 8 illustrate adjusting entire values in either left or right half of the x-axis of the graph. However, in some implementations, it may be possible that only a subset of values in either positive or negative x-axis may be adjusted. In another example, all four cases in FIG. 8 illustrate adjusting values by a certain factor (e.g., a scaling factor). However, in some implementations, a plurality of factors may be used for different regions of x-axis of the graphs in the example 800. Additionally, adjusting values by a certain factor may be implemented by multiplying a scaling factor or by adding or subtracting an offset value to or from the values.

Figure 9:
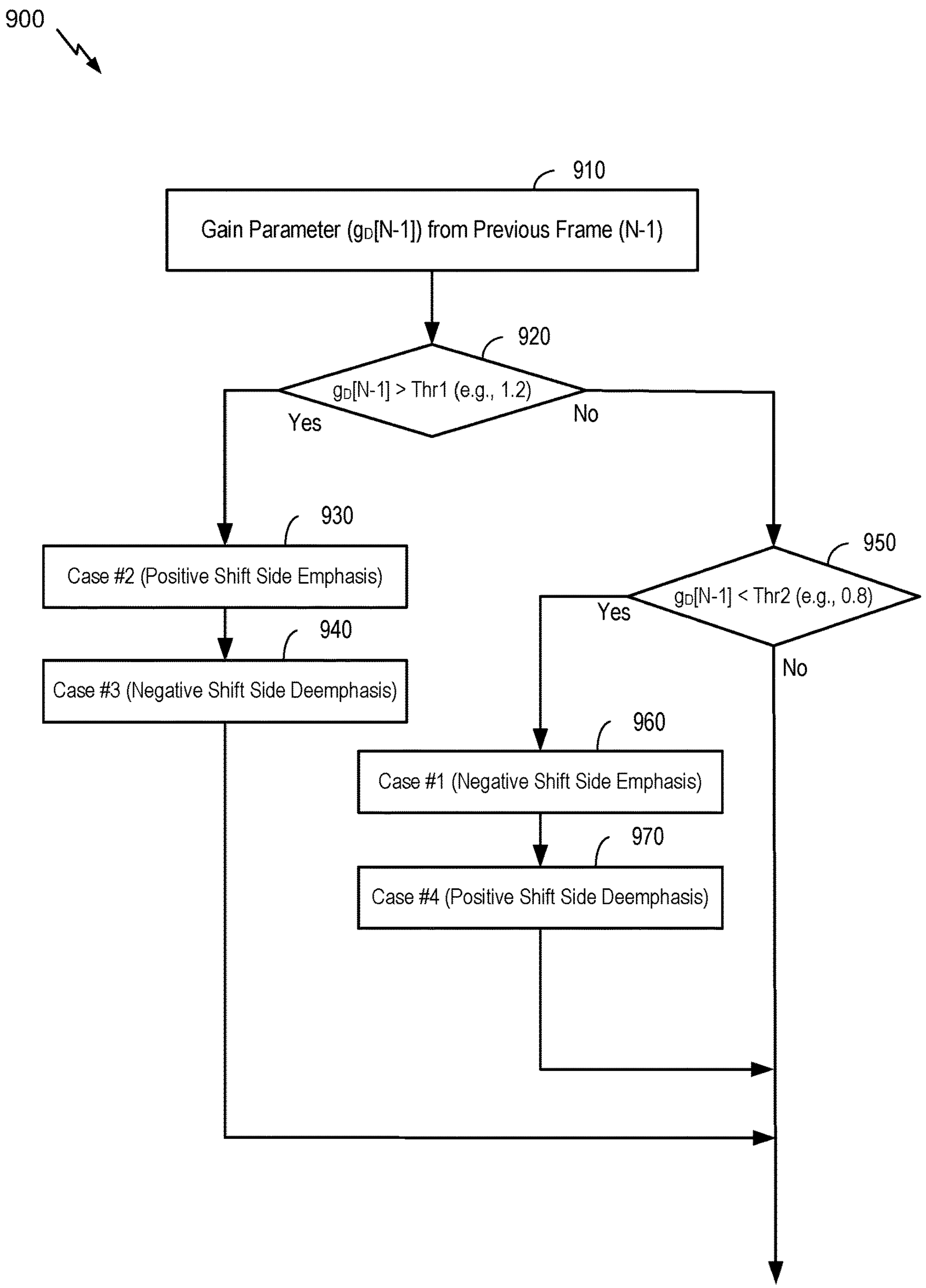
FIG. 9 is a flow chart illustrating a particular method of adjusting a subset of long-term smoothed comparison values based on a particular gain parameter.

Referring to FIG. 9, a method 900 of adjusting a subset of long-term smoothed comparison values based on a particular gain parameter is shown. The method 900 may be performed by the temporal equalizer 108, the encoder 114, the first device 104 of FIG. 1, or a combination thereof.

The method 900 includes calculating a gain parameter ($g_D$) for a previous frame (e.g., frame N−1), at 910. The gain parameter in 900 may be a gain parameter 160 in FIG. 1. In some implementations, temporal equalizer 108 may generate the gain parameter 160 (e.g., a codec gain parameter or target gain) based on samples of the target channel and based on samples of the reference channel. For example, the temporal equalizer 108 may select samples of the second audio signal 132 based on the non-causal mismatch value 162. Alternatively, the temporal equalizer 108 may select samples of the second audio signal 132 independent of the non-causal mismatch value 162. The temporal equalizer 108 may, in response to determining that the first audio signal 130 is the reference channel, determine the gain parameter 160 of the selected samples based on the first samples of the first frame 131 of the first audio signal 130. Alternatively, the temporal equalizer 108 may, in response to determining that the second audio signal 132 is the reference channel, determine the gain parameter 160 based on an energy of a reference frame of the reference channel and an energy of a target frame of the target channel. As an example, the gain parameter 160 may be calculated or generated based on one or more of the Equations 1a, 1b, 1c, 1d, 1e, or 1f. In some implementations, the gain parameter 160 ($g_D$) may be modified or smoothed over a plurality of frames by any known smoothing algorithms or alternatively by hysteresis to avoid large jumps in gain between frames.

The encoder 114 or temporal equalizer 108 may compare the gain parameter with a threshold (e.g., Thr1 or Thr2), at 920 950. When the gain parameter 160 ($g_D$), based on one or more of the Equations 1a-1f, is greater than 1, it may indicate that the first audio signal 130 (or left channel) is a leading channel ("a reference channel") and thus it is more likely that shift values ("temporal shift values") would be positive values. The temporal shift values may be one of a tentative mismatch value 536, an interpolated mismatch value 538, an amended mismatch value 540, a final mismatch value 116, or a non-causal mismatch value 162. Therefore, it may be advantageous to emphasize (or increase or boost or bias) the values in the positive shift side and/or deemphasize (or decrease) the values in the negative shift side.

When the gain parameter 160 ($g_D$), which is calculated based on one or more of Equations 1a-1f, is greater than 1, it may mean that the first audio signal 130 (or left channel) is a leading channel ("a reference channel") and thus it is more likely that shift values ("temporal shift values") would be a positive value. The temporal shift values may be one of a tentative mismatch value 536, an interpolated mismatch value 538, an amended mismatch value 540, a final mismatch value 116, or a non-causal mismatch value 162. Therefore, the likelihood of determining a correct non-causal shift value may be advantageously improved by emphasizing (or increasing or boosting or biasing) the values in the positive shift side and/or by deemphasizing (or decreasing) the values in the negative shift side.

When the gain parameter 160 ($g_D$), which is calculated based on one or more of Equations 1a-1f, is less than 1, it may mean that the second audio signal 130 (or right channel) is a leading channel ("a reference channel") and thus it is more likely that shift values ("temporal shift values") would be a negative value, the likelihood of determining a correct non-causal shift value may be advantageously improved by emphasizing (or increasing or boosting or biasing) the values in the negative shift side and/or deemphasizing (or decreasing) the values in the positive shift side.

In some implementations, the encoder 114 or temporal equalizer 108 may compare the gain parameter 160 ($g_D$) with a first threshold (e.g., Thr1=1.2) or another threshold (e.g., Thr2=0.8). For illustration purpose, FIG. 9 shows the first comparison between the gain parameter 160 ($g_D$) and a Thr1 at 920 comes before the second comparison between the gain parameter 160 ($g_D$) and a Thr2 at 950. However, the order between the first comparison 920 and the second comparison 950 may be reversed without loss of generality. In some implementations, any one of the first comparison 920 and the second comparison 950 may be executed without the other comparison.

The encoder 114 or temporal equalizer 108 may adjust a first subset of the first long-term smoothed comparison values to generate second long-term smoothed comparison values, in response to the comparison result. For example, when the gain parameter 160 ($g_D$) is greater than a first threshold (e.g., Thr1=1.2), the method 900 may adjust a subset of the first long-term smoothed comparison values by at least one among emphasizing positive shift side (e.g., Case #2 830 930) and deemphasizing negative shift side (e.g., Case #3 840 940) to avoid spurious jumps in signs (positive or negative) of temporal shift values between adjacent frames. In some implementations, both Case #2 (e.g., positive shift side emphasis) and Case #3 (negative shift side deemphasis) may be executed in any order between them. Alternatively, when Case #2 (e.g., positive shift side emphasis) was selected to emphasize the positive shift side, the values of the other side (e.g., negative side) may be zeroed out, instead of executing Case #3, to reduce the risk of detecting incorrect sign of temporal shift values.

Additionally, when the gain parameter 160 ($g_D$) is less than a second threshold (e.g., Thr2=0.8), the method 900 may adjust a subset of the first long-term smoothed comparison values by at least one among emphasizing negative shift side (e.g., Case #1 860 960) and deemphasizing positive shift side (e.g., Case #4 870 970) to avoid spurious jumps in signs (positive or negative) of temporal shift values between adjacent frames. In some implementations, both Case #1 (e.g., negative shift side emphasis) and Case #4 (positive shift side deemphasis) may be executed in any order between them. Alternatively, when Case #1 (e.g., negative shift side emphasis) was selected to emphasize the negative shift side, the values of the other side (e.g., positive side) may be zeroed out, instead of executing Case #4, to reduce the risk of detecting incorrect sign of temporal shift values.

Although, the method 900 shows an adjustment may be performed, based on the gain parameter 160 ($g_D$), on values of a subset of the first long-term smoothed comparison values, adjustment alternatively may be performed on either an instantaneous comparison values or values of a subset of the short-term smoothed comparison values. In some implementations, adjusting values may be performed using a smooth window (e.g., a smooth scaling window) over multiple lag values. In other implementations, the length of a smooth window may be adaptively changed for example based on the value of cross-correlation of comparison values. For example, the encoder 114 or temporal equalizer 108 may adjust the length of a smooth window based on a cross-correlation value ($\text{CrossCorr\_CompVal}_N$) 765 of an instantaneous comparison values $\text{CompVal}_N(k)$ 735 for the frame N 710 720 and short-term smoothed comparison values $\text{CompVal}_{ST_N}(k)$ 745 for the frame N 710 720.

Figure 10:
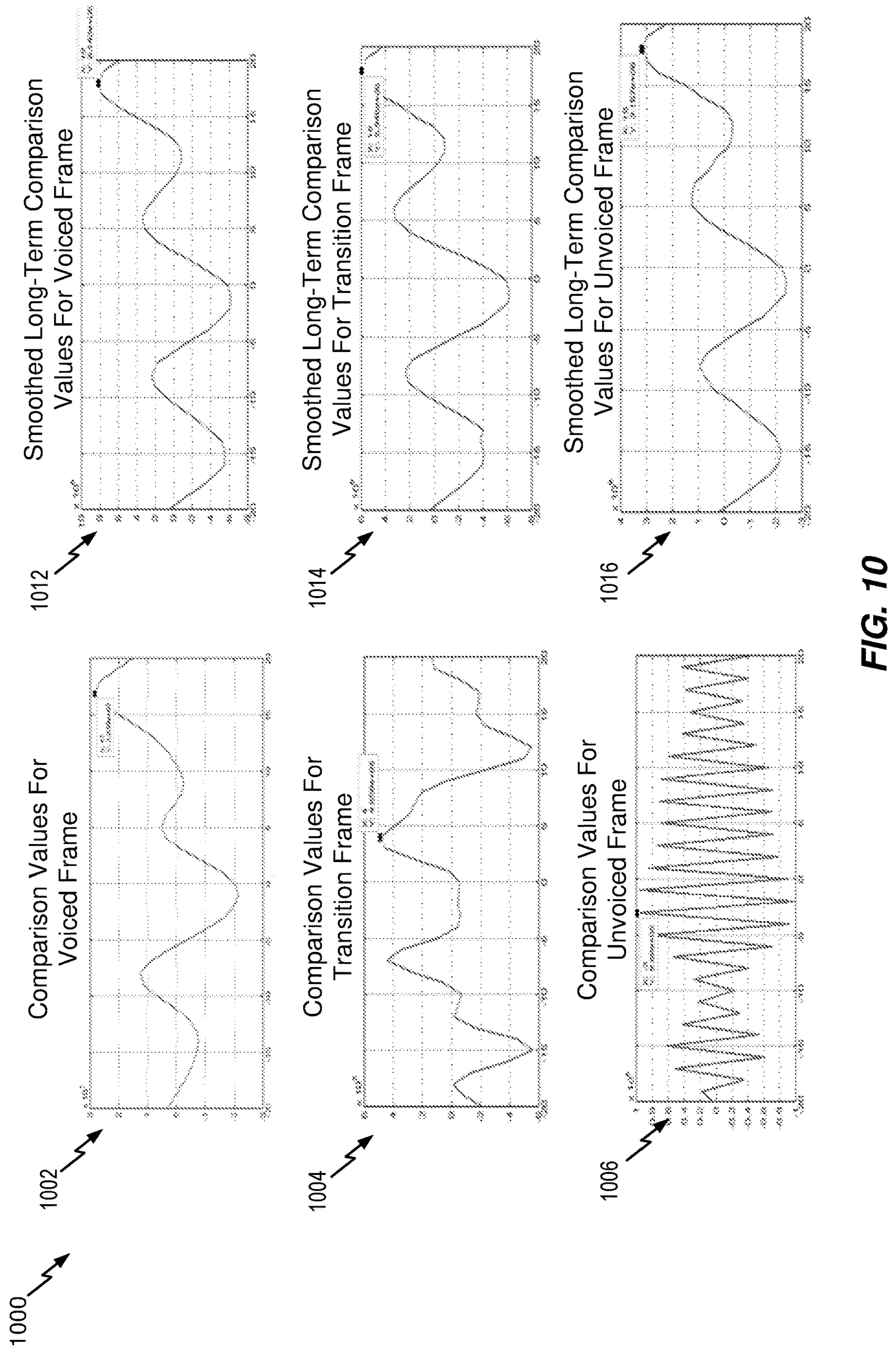
FIG. 10 depicts graphs illustrating comparison values for voiced frames, transition frames, and unvoiced frames.

Referring to FIG. 10, graphs illustrating comparison values for voiced frames, transition frames, and unvoiced frames are shown. According to FIG. 10, the graph 1002 illustrates comparison values (e.g., cross-correlation values) for a voiced frame processed without using the long-term smoothing techniques described, the graph 1004 illustrates comparison values for a transition frame processed without using the long-term smoothing techniques described, and the graph 1006 illustrates comparison values for an unvoiced frame processed without using the long-term smoothing techniques described.

The cross-correlation represented in each graph 1002, 1004, 1006 may be substantially different. For example, the graph 1002 illustrates that a peak cross-correlation between a voiced frame captured by the first microphone 146 of FIG. 1 and a corresponding voiced frame captured by the second microphone 148 of FIG. 1 occurs at approximately a 17 sample shift. However, the graph 1004 illustrates that a peak cross-correlation between a transition frame captured by the first microphone 146 and a corresponding transition frame captured by the second microphone 148 occurs at approximately a 4 sample shift. Moreover, the graph 1006 illustrates that a peak cross-correlation between an unvoiced frame captured by the first microphone 146 and a corresponding unvoiced frame captured by the second microphone 148 occurs at approximately a −3 sample shift. Thus, the shift estimate may be inaccurate for transition frames and unvoiced frames due to a relatively high level of noise.

According to FIG. 10, the graph 1012 illustrates comparison values (e.g., cross-correlation values) for a voiced frame processed using the long-term smoothing techniques described, the graph 1014 illustrates comparison values for a transition frame processed using the long-term smoothing techniques described, and the graph 1016 illustrates comparison values for an unvoiced frame processed using the long-term smoothing techniques described. The cross-correlation values in each graph 1012, 1014, 1016 may be substantially similar. For example, each graph 1012, 1014, 1016 illustrates that a peak cross-correlation between a frame captured by the first microphone 146 of FIG. 1 and a corresponding frame captured by the second microphone 148 of FIG. 1 occurs at approximately a 17 sample shift. Thus, the shift estimates for transition frames (illustrated by the graph 1014) and unvoiced frames (illustrated by the graph 1016) may be relatively accurate (or similar) to the shift estimate of the voiced frame in spite of noise.

Figure 11:
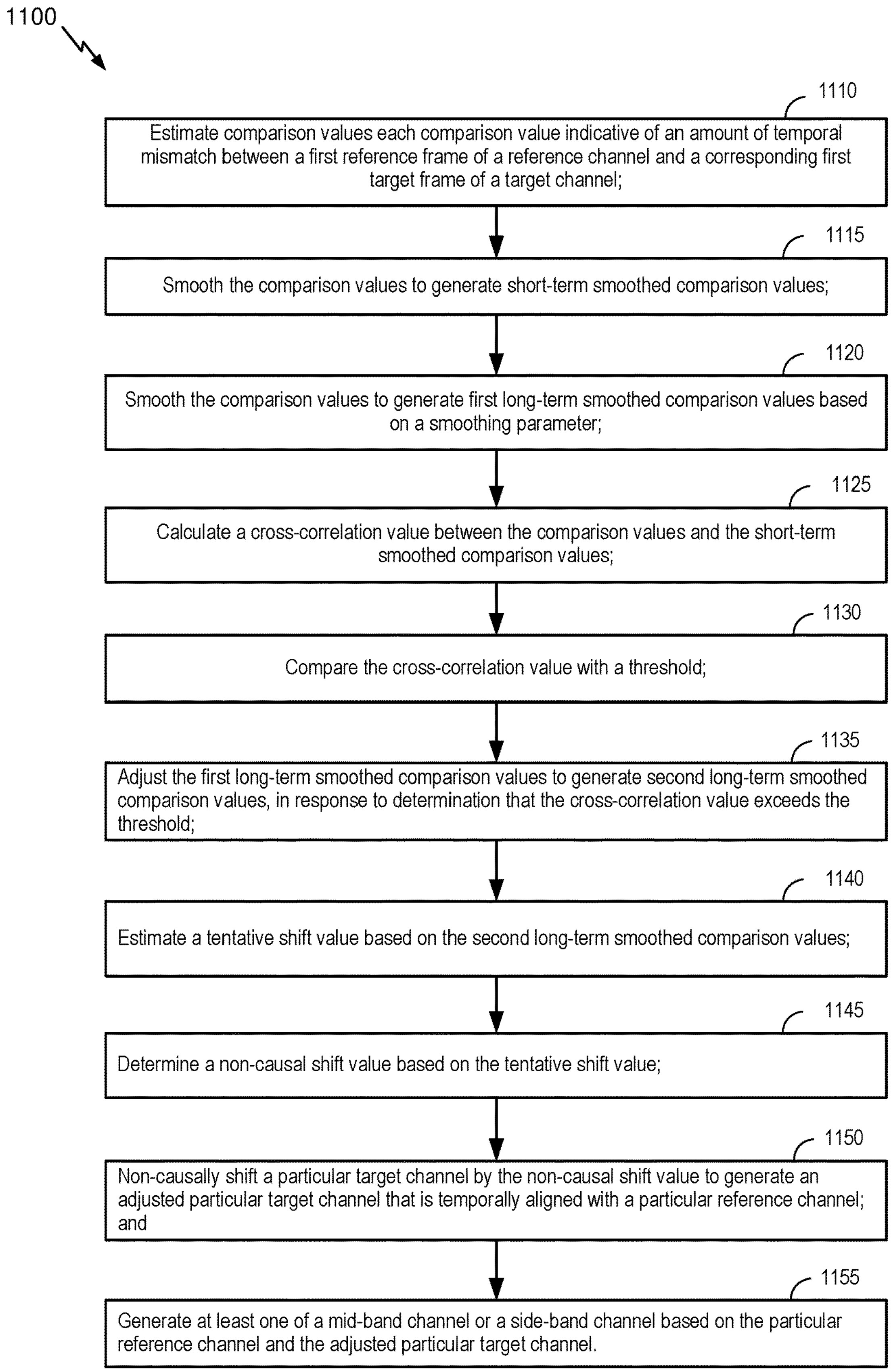
FIG. 11 is a flow chart illustrating a particular method of non-causally shifting a channel based on a temporal offset between audio captured at multiple microphones.

Referring to FIG. 11, a method 1100 of non-causally shifting a channel based on a temporal offset between audio captured at multiple microphones is shown. The method 1100 may be performed by the temporal equalizer 108, the encoder 114, the first device 104 of FIG. 1, or a combination thereof.

The method 1100 includes estimating comparison values at an encoder, at 1110. Each comparison value may be indicative of an amount of temporal mismatch, or a measure of the similarity or dissimilarity between a first reference frame of a reference channel and a corresponding first target frame of a target channel, at 1110. In some implementations, cross-correlation function between the reference frame and the target frame may be used to measure the similarity of the two frames as a function of the lag of one frame relative to the other. For example, referring to FIG. 1, the encoder 114 or temporal equalizer 108 may estimate comparison values (e.g., cross-correlation values) indicative of an amount of temporal mismatch, or a measure of the similarity or dissimilarity between reference frames (captured earlier in time) and corresponding target frames (captured earlier in time). To illustrate, if $\text{CompVal}_N(k)$ represents the comparison value at a shift of k for the frame N, the frame N may have comparison values from k=T_MIN (a minimum shift) to k=T_MAX (a maximum shift).

The method 1100 includes smoothing the comparison values to generate short-term smoothed comparison values, at 1115. For example, the encoder 114 or temporal equalizer 108 may smooth the comparison values to generate short-term smoothed comparison values. The short-term smoothed comparison values (e.g., $\text{CompVal}_{ST_N}(k)$ for frame N) may be estimated as a smoothed version of the comparison values of the frames in vicinity of the current frame (e.g., frame N) being processed. To illustrate, the short-term comparison values may be generated as a linear combination of a plurality of comparison values from current and previous frames $$\left(\text{e.g., } CompVal_{ST_N}(k) = \frac{(CompVal_N(k) + CompVal_{N-1}(k) + CompVal_{N-2}(k))}{3}\right).$$

In some implementations, a non-uniform weighting may be applied to the plurality of comparison values for the current and previous frames. In other implementations, the short-term comparison values may be the same as the comparison values generated in the frame being processed ($CompVal_N(k)$).

The method 1100 includes smoothing the comparison values to generate first long-term smoothed comparison values based on a smoothing parameter, at 1120. For example, the encoder 114 or temporal equalizer 108 may smooth the comparison values to generate smoothed comparison values based on historical comparison value data and a smoothing parameter. The smoothing may be performed such that a long-term smoothed comparison values $CompVal_{LT_N}(k)$ is represented by $CompVal_{LT_N}(k)=f(CompVal_N(k), CompVal_{N-1}(k), CompVal_{LT_{N-2}}(k), \ldots)$. The function $f$ in the above equation may be a function of all (or a subset) of past comparison values at the shift (k). An alternative representation of the may be $CompVal_{LT_N}(k)=g(CompVal_N(k), CompVal_{N-1}(k), CompVal_{N-2}(k), \ldots)$. The functions $f$ or g may be simple finite impulse response (FIR) filters or infinite impulse response (IIR) filters, respectively. For example, the function g may be a single tap IIR filter such that the long-term smoothed comparison values $CompVal_{LT_N}(k)$ is represented by $CompVal_{LT_N}(k)=(1-\alpha)*CompVal_N(k)+(a)*CompVal_{LT_{N-1}}(k)$, where a E (0, 1.0). Thus, the long-term smoothed comparison values $CompVal_{LT_N}(k)$ may be based on a weighted mixture of the instantaneous comparison values $CompVal_N(k)$ for the frame N and the long-term smoothed comparison values $CompVal_{LT_{N-1}}(k)$ for one or more previous frames.

According to one implementation, the smoothing parameter may be adaptive. For example, the method 1100 may include adapting the smoothing parameter based on a correlation of short-term smoothed comparison values to long-term smoothed comparison values. As the value of α increases, the amount of smoothing in the long-term smoothed comparison value increases. A value of the smoothing parameter (α) may be adjusted based on short-term energy indicators of input channels and long-term energy indicators of the input channels. Additionally, the value of the smoothing parameter (α) may be reduced if the short-term energy indicators are greater than the long-term energy indicators. According to another implementation, a value of the smoothing parameter (α) is adjusted based on a correlation of short-term smoothed comparison values to long-term smoothed comparison values. Additionally, the value of the smoothing parameter (α) may be increased if the correlation exceeds a threshold. According to another implementation, the comparison values may be cross-correlation values of down-sampled reference channels and corresponding down-sampled target channel.

The method 1100 includes calculating a cross-correlation value between the comparison values and the short-term smoothed comparison values, at 1125. For example, the encoder 114 or temporal equalizer 108 may calculate a cross-correlation value of the comparison values ($CrossCorr\_CompVal_N$) 765 between the comparison values for a single frame ("instantaneous comparison values" $CompVal_N(k)$) 735 and short-term smoothed comparison values ($CompVal_{ST_N}(k)$) 745. The cross-correlation value of the comparison values ($CrossCorr\_CompVal_N$) 765 may be a single value estimated per each frame (N), and it may correspond to a degree of cross-correlation between two other correlation values. For example, the encoder 114 or temporal equalizer 108 may calculate ($CrossCorr\_CompVal_N$) 765 as $CrossCorr\_CompVal_N=(\Sigma_k CompVal_{ST_N}(k)*CompVal_N(k))/Fac$. Where 'Fac' is a normalization factor chosen such that the $CrossCorr\_CompVal_N$ is restricted between 0 and 1.

In alternative implementations, the method 1100 may include calculating a cross-correlation value between the short-term smoothed comparison values and the long-term smoothed comparison values, at 1125. For example, the encoder 114 or temporal equalizer 108 may calculate a cross-correlation value of the comparison values ($CrossCorr\_CompVal_N$) 765 between short-term smoothed comparison values ($CompVal_{ST_N}(k)$) 745 and long-term smoothed comparison values ($CompVal_{LT_N}(k)$) 755. The cross-correlation value of the comparison values ($CrossCorr\_CompVal_N$) 765 may be a single value estimated per each frame (N)), and it may correspond to a degree of cross-correlation between two other correlation values. For example, the encoder 114 or temporal equalizer 108 may calculate ($CrossCorr\_CompVal_N$) 765 as $CrossCorr\_CompVal_N=(\Sigma_k CompVal_{ST_N}(k)*CompVal_{LT_{N-1}}(k))/Fac$.

The method 1100 includes comparing the cross-correlation value with a threshold, at 1130. For example, the encoder 114 or temporal equalizer 108 may compare the cross-correlation value ($CrossCorr\_CompVal_N$) 765 with a threshold. The method 1100 also includes adjusting the first long-term smoothed comparison values to generate second long-term smoothed comparison values, in response to determination that the cross-correlation value exceeds the threshold, at 1135. For example, the encoder 114 or temporal equalizer 108 may adjust a whole or some part of the first long-term smoothed comparison values 755 based on the comparison result. In some implementations, the encoder 114 or temporal equalizer 108 may increase (or boost or bias) certain values of a subset of the first long-term smoothed comparison values 755 in response to the determination that the cross-correlation value of the comparison values ($CrossCorr\_CompVal_N$) 765 exceeds the threshold. For example, when the cross-correlation value of the comparison values ($CrossCorr\_CompVal_N$) is bigger than or equal to a threshold (e.g., 0.8), it may indicate the cross-correlation value between comparison values is quite strong or high, indicating small or no variations of temporal shift values between adjacent frames. Thus, the estimated temporal shift value of the current frame (e.g., frame N) cannot be too far off from the temporal shift values of the previous frame (e.g., frame N−1) or the temporal shift values of any other previous frames. The temporal shift values may be one of a tentative mismatch value 536, an interpolated mismatch value 538, an amended mismatch value 540, a final mismatch value 116, or a non-causal mismatch value 162. Therefore, the encoder 114 or temporal equalizer 108 may increase (or boost or bias) certain values of a subset of the first long-term smoothed comparison values 755, for example, by a factor of 1.2 (20% boost or increase) to generate a second long-term smoothed comparison values. This boosting or biasing may be implemented by multiplying a scaling factor or by adding an offset to the values within the subset of the first long-term smoothed comparison values 755. In some implementations, the encoder 114 or temporal equalizer 108 may boost or bias the subset of the first long long-term smoothed comparison values 755 such that the subset may include an index corresponding to the temporal shift value of the previous frame (e.g., frame N−1). Additionally, or alternatively the subset may further include an index around the vicinity of the temporal shift value of the previous frame (e.g., frame N−1). For example, the vicinity may mean within −delta (e.g., delta is in the range of 1-5 samples in a preferred embodiment) and +delta of the temporal shift value of the previous frame (e.g., frame N−1).

The method 1100 includes estimating a tentative shift value based on the second long-term smoothed comparison values, at 1140. For example, the encoder 114 or temporal equalizer 108 may estimate a tentative shift value 536 based on the second long-term smoothed comparison values. The method 1100 also includes determining a non-causal shift value based on the tentative shift value, at 1145. For example, the encoder 114 or temporal equalizer 108 may determine a non-causal shift value (e.g., the non-causal mismatch value 162) based at least in part on the tentative shift value (e.g., the tentative mismatch value 536, the interpolated mismatch value 538, the amended mismatch value 540, or final mismatch value 116).

The method 1100 includes non-causally shifting a particular target channel by the non-causal shift value to generate an adjusted particular target channel that is temporally aligned with a particular reference channel, at 1150. For example, the encoder 114 or temporal equalizer 108 may non-causally shift the target channel by the non-causal shift value (e.g., the non-causal mismatch value 162) to generate an adjusted target channel that is temporally aligned with the reference channel. The method 1100 also includes generating at least one of a mid-band channel or a side-band channel based on the particular reference channel and the adjusted particular target channel, at 1155. For example, referring to FIG. 11, the encoder 114 may generate at least a mid-band channel and a side-band channel based on the reference channel and the adjusted target channel.

Figure 12:
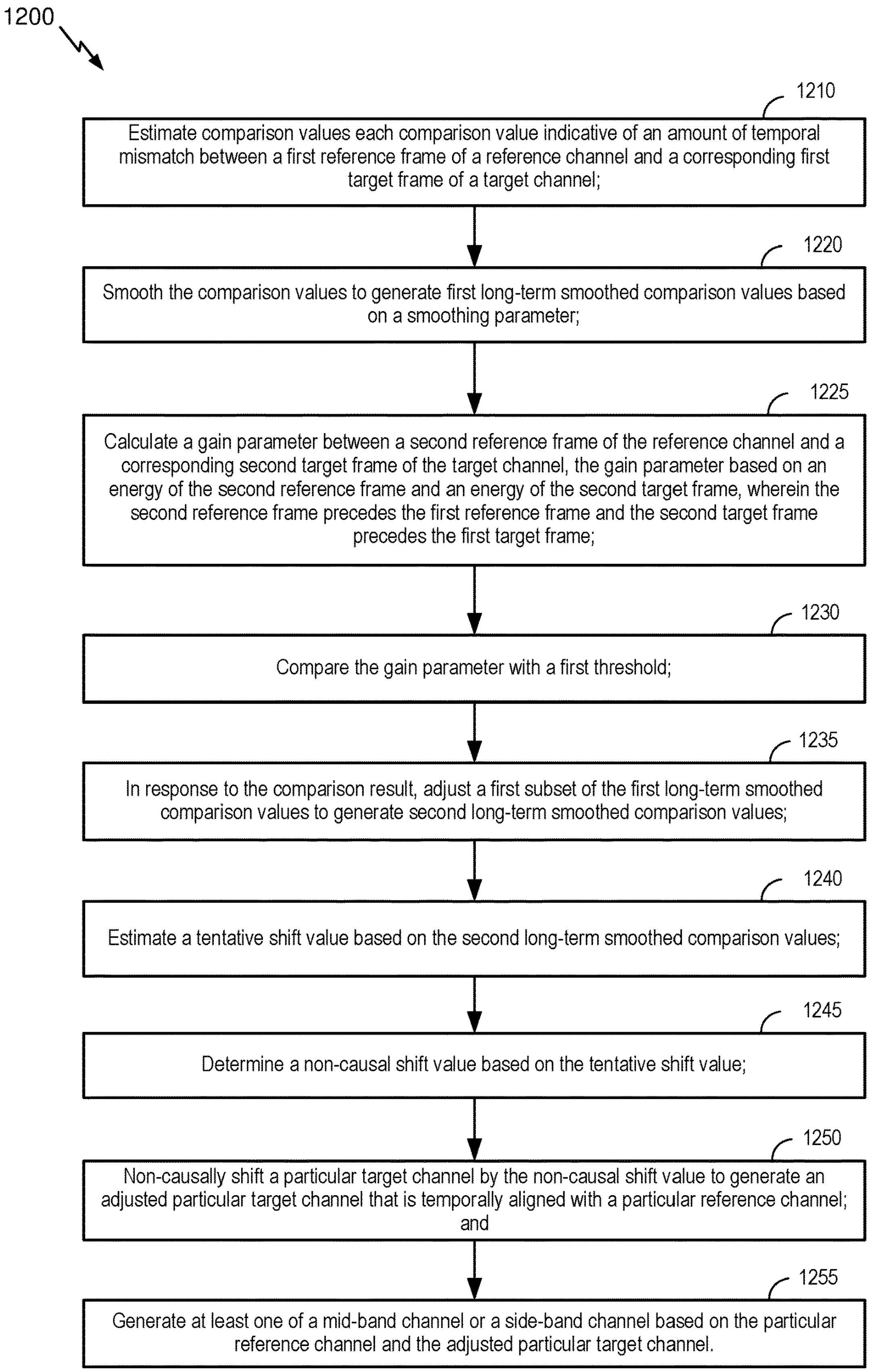
FIG. 12 is a flow chart illustrating another particular method of non-causally shifting a channel based on a temporal offset between audio captured at multiple microphones.

Referring to FIG. 12, a method 1200 of non-causally shifting a channel based on a temporal offset between audio captured at multiple microphones is shown. The method 1200 may be performed by the temporal equalizer 108, the encoder 114, the first device 104 of FIG. 1, or a combination thereof.

The method 1200 includes estimating comparison values at an encoder, at 1210. For example, the method at 1210 may be similar to the method at 1110, as described with reference to FIG. 11. The method 1200 also includes smoothing the comparison values to generate first long-term smoothed comparison values based on a smoothing parameter, at 1220. For example, the method at 1220 may be similar to the method at 1120, as described with reference to FIG. 11.

The method 1200 includes calculating a gain parameter from a previous reference frame of a reference channel and a corresponding previous target frame of a target channel, at 1225. In some implementations, the gain parameter from the previous frame may be based on an energy of the previous reference frame and an energy of the previous target frame. In some implementations, the encoder 114 or temporal equalizer 108 may generate or calculate the gain parameter 160 (e.g., a codec gain parameter or target gain) based on samples of the target channel and based on samples of the reference channel. For example, the temporal equalizer 108 may select samples of the second audio signal 132 based on the non-causal mismatch value 162. Alternatively, the temporal equalizer 108 may select samples of the second audio signal 132 independent of the non-causal mismatch value 162. The temporal equalizer 108 may, in response to determining that the first audio signal 130 is the reference channel, determine the gain parameter 160 of the selected samples based on the first samples of the first frame 131 of the first audio signal 130. Alternatively, the temporal equalizer 108 may, in response to determining that the second audio signal 132 is the reference channel, determine the gain parameter 160 based on an energy of a reference frame of the reference channel and an energy of a target frame of the target channel. As an example, the gain parameter 160 may be calculated or generated based on one or more of the Equations 1a, 1b, 1c, 1d, 1e, or 1f. In some implementations, the gain parameter 160 ($g_D$) may be modified or smoothed over a plurality of frames by any known smoothing algorithms or alternatively by hysteresis to avoid large jumps in gain between frames.

The method 1200 also includes comparing the gain parameter with a first threshold, at 1230. For example, the encoder 114 or temporal equalizer 108 may compare the gain parameter with a first threshold (e.g., Thr1 or Thr2), at 1230. When the gain parameter 160 ($g_D$), based on one or more of the Equations 1a-1f, is greater than 1, it may indicate that the first audio signal 130 (or left channel) is a leading channel ("a reference channel") and thus it is more likely that shift values ("temporal shift values") would be positive values. The temporal shift values may be one of a tentative mismatch value 536, an interpolated mismatch value 538, an amended mismatch value 540, a final mismatch value 116, or a non-causal mismatch value 162. Therefore, it may be advantageous to emphasize (or increase or boost or bias) the values in the positive shift side and/or deemphasize (or decrease) the values in the negative shift side. In some implementations, the encoder 114 or temporal equalizer 108 may compare the gain parameter 160 ($g_D$) with a first threshold (e.g., Thr1=1.2) or another threshold (e.g., Thr2=0.8), as described with reference to FIG. 9.

The method 1200 also includes adjusting a first subset of the first long-term smoothed comparison values, in response to the comparison result, to generate second long-term smoothed comparison values, at 1235. For example, the encoder 114 or temporal equalizer 108 may adjust a first subset of the first long-term smoothed comparison values $CompVal_{LT_N}(k)$ 755 to generate second long-term smoothed comparison values, in response to the comparison result. In a preferred embodiment, the first subset of the first long-term smoothed comparison values corresponds to either a positive half (e.g., positive shift side 820) or a negative half (e.g., negative shift side 810) of the first long-term smoothed comparison values $CompVal_{LT_N}(k)$ 755, as described with reference to FIG. 9. In some implementations, the encoder 114 or temporal equalizer 108 may adjust a first subset of the first long-term smoothed comparison values $CompVal_{LT_N}(k)$ 755 in accordance with four examples shown in FIG. 8—Case #1 (negative shift side emphasis) 830, Case #2 (positive shift side emphasis) 840, Case #3 (negative shift side deemphasis) 850, and Case #4 (positive shift side deemphasis) 860.

Returning to FIG. 8, the example 800 illustrates four cases showing that a subset of the long-term smoothed comparison values (e.g., the first long-term smoothed comparison values $CompVal_{LT_N}(k)$ 755) may be adjusted based on the comparison result. Adjusting a subset of the long-term smoothed comparison values in the example 800 may include increasing certain values of the subset of the long-term smoothed comparison values (e.g., the first long-term smoothed comparison values $CompVal_{LT_N}(k)$ 755) by a certain factor. For example, FIGS. 8-9 illustrates example of increasing certain values (e.g., Case #1 and Case #2 in FIG. 8) in accordance with certain exemplary conditions as described earlier with reference to a flowchart in FIG. 9. Adjusting the subset of the long-term smoothed comparison values may also include decreasing certain values of the subset of the long-term smoothed comparison values (e.g., the first long-term smoothed comparison values 755) by a certain factor. FIGS. 8-9 illustrates example of decreasing certain values (e.g., Case #3 and Case #4 in FIG. 8) in accordance with certain exemplary conditions as described earlier with reference to a flowchart in FIG. 9.

Four cases in FIG. 8 are presented only for illustration purpose, and therefore any ranges or values or factors used therein are not meant to be limiting examples. For example, all four cases in FIG. 8 illustrate adjusting entire values in either left or right half of the x-axis of the graph. However, in some implementations, it may be possible that only a subset of values in either positive or negative x-axis may be adjusted. In another example, all four cases in FIG. 8 illustrate adjusting values by a certain factor (e.g., a scaling factor). However, in some implementations, a plurality of factors may be used for different regions of x-axis of the graphs in the example 800. Additionally, adjusting values by a certain factor may be implemented by multiplying a scaling factor or by adding or subtracting an offset value to or from the values.

The method 1200 includes estimating a tentative shift value based on the second long-term smoothed comparison values, at 1240. For example, the method at 1240 may be similar to the method at 1140, as described with reference to FIG. 11. The method 1200 also includes determining a non-causal shift value based on the tentative shift value, at 1245. For example, the method at 1245 may be similar to the method at 1145, as described with reference to FIG. 11. The method 1200 includes non-causally shifting a particular target channel by the non-causal shift value to generate an adjusted particular target channel that is temporally aligned with a particular reference channel, at 1250. For example, the method at 1250 may be similar to the method at 1150, as described with reference to FIG. 11. The method 1200 also includes generating at least one of a mid-band channel or a side-band channel based on the particular reference channel and the adjusted particular target channel, at 1255. For example, the method at 1255 may be similar to the method at 1155, as described with reference to FIG. 11.

Figure 13:
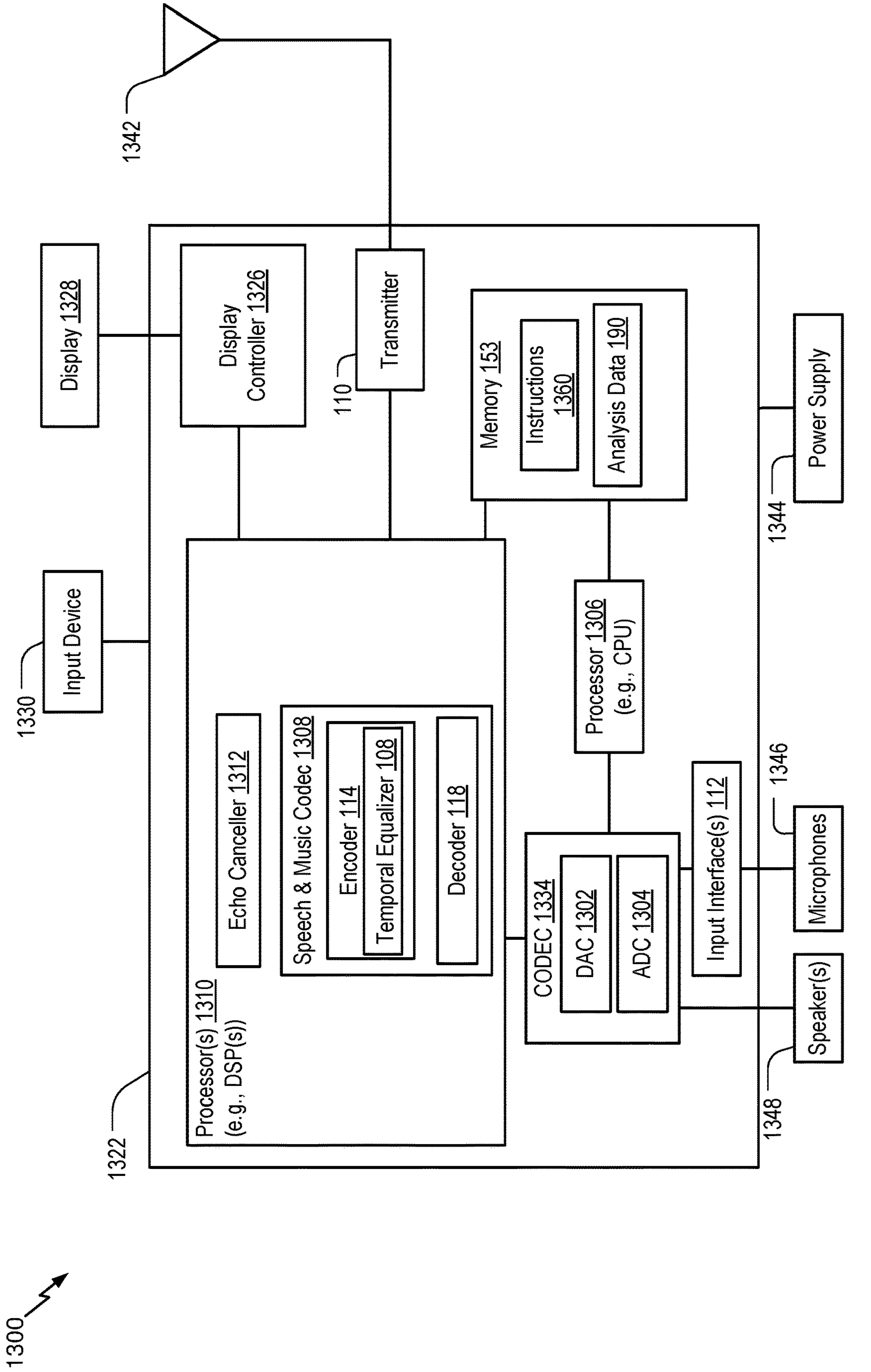
FIG. 13 is a block diagram of a particular illustrative example of a device that is operable to encode multiple channels.

Referring to FIG. 13, a block diagram of a particular illustrative example of a device (e.g., a wireless communication device) is depicted and generally designated 1300. In various embodiments, the device 1300 may have fewer or more components than illustrated in FIG. 13. In an illustrative embodiment, the device 1300 may correspond to the first device 104 or the second device 106 of FIG. 1. In an illustrative embodiment, the device 1300 may perform one or more operations described with reference to systems and methods of FIGS. 1-12.

In a particular embodiment, the device 1300 includes a processor 1306 (e.g., a central processing unit (CPU)). The device 1300 may include one or more additional processors 1310 (e.g., one or more digital signal processors (DSPs)). The processors 1310 may include a media (e.g., speech and music) coder-decoder (CODEC) 1308, and an echo canceller 1312. The media CODEC 1308 may include the decoder 118, the encoder 114, or both, of FIG. 1. The encoder 114 may include the temporal equalizer 108.

The device 1300 may include a memory 153 and a CODEC 1334. Although the media CODEC 1308 is illustrated as a component of the processors 1310 (e.g., dedicated circuitry and/or executable programming code), in other embodiments one or more components of the media CODEC 1308, such as the decoder 118, the encoder 114, or both, may be included in the processor 1306, the CODEC 1334, another processing component, or a combination thereof.

The device 1300 may include the transmitter 110 coupled to an antenna 1342. The device 1300 may include a display 1328 coupled to a display controller 1326. One or more speakers 1348 may be coupled to the CODEC 1334. One or more microphones 1346 may be coupled, via the input interface(s) 112, to the CODEC 1334. In a particular implementation, the speakers 1348 may include the first loudspeaker 142, the second loudspeaker 144 of FIG. 1, the Yth loudspeaker 244 of FIG. 2, or a combination thereof. In a particular implementation, the microphones 1346 may include the first microphone 146, the second microphone 148 of FIG. 1, the Nth microphone 248 of FIG. 2, the third microphone 1146, the fourth microphone 1148 of FIG. 11, or a combination thereof. The CODEC 1334 may include a digital-to-analog converter (DAC) 1302 and an analog-to-digital converter (ADC) 1304.

The memory 153 may include instructions 1360 executable by the processor 1306, the processors 1310, the CODEC 1334, another processing unit of the device 1300, or a combination thereof, to perform one or more operations described with reference to FIGS. 1-12. The memory 153 may store the analysis data 190.

One or more components of the device 1300 may be implemented via dedicated hardware (e.g., circuitry), by a processor executing instructions to perform one or more tasks, or a combination thereof. As an example, the memory 153 or one or more components of the processor 1306, the processors 1310, and/or the CODEC 1334 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 1360) that, when executed by a computer (e.g., a processor in the CODEC 1334, the processor 1306, and/or the processors 1310), may cause the computer to perform one or more operations described with reference to FIGS. 1-12. As an example, the memory 153 or the one or more components of the processor 1306, the processors 1310, and/or the CODEC 1334 may be a non-transitory computer-readable medium that includes instructions (e.g., the instructions 1360) that, when executed by a computer (e.g., a processor in the CODEC 1334, the processor 1306, and/or the processors 1310), cause the computer to perform one or more operations described with reference to FIGS. 1-12.

In a particular embodiment, the device 1300 may be included in a system-in-package or system-on-chip device (e.g., a mobile station modem (MSM)) 1322. In a particular embodiment, the processor 1306, the processors 1310, the display controller 1326, the memory 153, the CODEC 1334, and the transmitter 110 are included in a system-in-package or the system-on-chip device 1322. In a particular embodiment, an input device 1330, such as a touchscreen and/or keypad, and a power supply 1344 are coupled to the system-on-chip device 1322. Moreover, in a particular embodiment, as illustrated in FIG. 13, the display 1328, the input device 1330, the speakers 1348, the microphones 1346, the antenna 1342, and the power supply 1344 are external to the system-on-chip device 1322. However, each of the display 1328, the input device 1330, the speakers 1348, the microphones 1346, the antenna 1342, and the power supply 1344 can be coupled to a component of the system-on-chip device 1322, such as an interface or a controller.

The device 1300 may include a wireless telephone, a mobile communication device, a mobile phone, a smart phone, a cellular phone, a laptop computer, a desktop computer, a computer, a tablet computer, a set top box, a personal digital assistant (PDA), a display device, a television, a gaming console, a music player, a radio, a video player, an entertainment unit, a communication device, a fixed location data unit, a personal media player, a digital video player, a digital video disc (DVD) player, a tuner, a camera, a navigation device, a decoder system, an encoder system, or any combination thereof.

In a particular implementation, one or more components of the systems described herein and the device 1300 may be integrated into a decoding system or apparatus (e.g., an electronic device, a CODEC, or a processor therein), into an encoding system or apparatus, or both. In other implementations, one or more components of the systems described herein and the device 1300 may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

It should be noted that various functions performed by the one or more components of the systems described herein and the device 1300 are described as being performed by certain components or modules. This division of components and modules is for illustration only. In an alternate implementation, a function performed by a particular component or module may be divided amongst multiple components or modules. Moreover, in an alternate implementation, two or more components or modules of the systems described herein may be integrated into a single component or module. Each component or module illustrated in systems described herein may be implemented using hardware (e.g., a field-programmable gate array (FPGA) device, an application-specific integrated circuit (ASIC), a DSP, a controller, etc.), software (e.g., instructions executable by a processor), or any combination thereof.

In conjunction with the described implementations, an apparatus includes means for capturing a reference channel. The reference channel may include a reference frame. For example, the means for capturing the first audio signal may include the first microphone 146 of FIGS. 1-2, the microphone(s) 1346 of FIG. 13, one or more devices/sensors configured to capture the reference channel (e.g., a processor executing instructions that are stored at a computer-readable storage device), or a combination thereof.

The apparatus may also include means for capturing a target channel. The target channel may include a target frame. For example, the means for capturing the second audio signal may include the second microphone 148 of FIGS. 1-2, the microphone(s) 1346 of FIG. 13, one or more devices/sensors configured to capture the target channel (e.g., a processor executing instructions that are stored at a computer-readable storage device), or a combination thereof.

The apparatus may also include means for estimating a delay between the reference frame and the target frame. For example, the means for determining the delay may include the temporal equalizer 108, the encoder 114, the first device 104 of FIG. 1, the media CODEC 1308, the processors 1310, the device 1300, one or more devices configured to determine the delay (e.g., a processor executing instructions that are stored at a computer-readable storage device), or a combination thereof.

The apparatus may also include means for estimating a temporal offset between the reference channel and the target channel based on the delay and based on historical delay data. For example, the means for estimating the temporal offset may include the temporal equalizer 108, the encoder 114, the first device 104 of FIG. 1, the media CODEC 1308, the processors 1310, the device 1300, one or more devices configured to estimate the temporal offset (e.g., a processor executing instructions that are stored at a computer-readable storage device), or a combination thereof.

Figure 14:
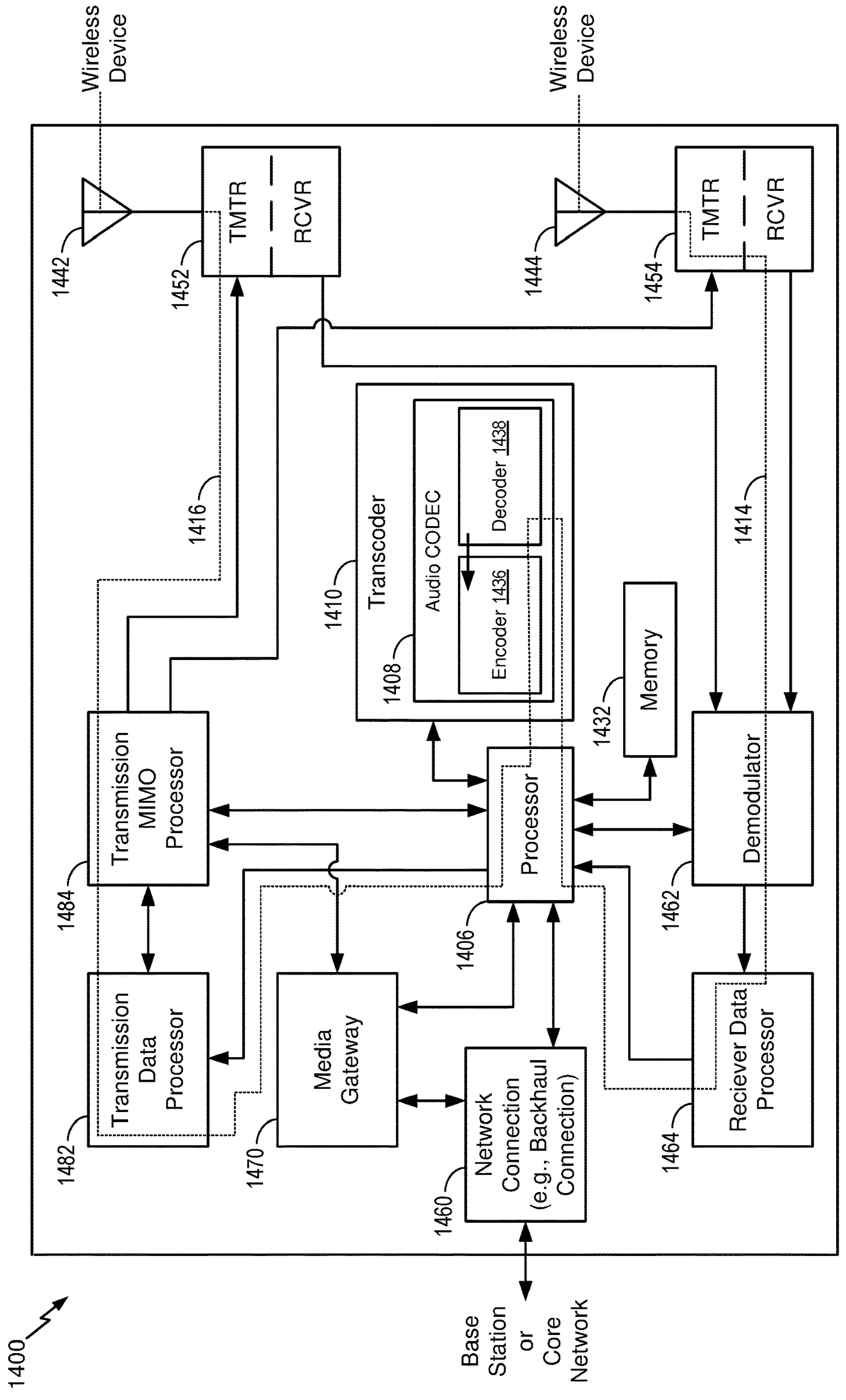
FIG. 14 is a block diagram of a base station that is operable to encode multiple channels.

Referring to FIG. 14, a block diagram of a particular illustrative example of a base station 1400 is depicted. In various implementations, the base station 1400 may have more components or fewer components than illustrated in FIG. 14. In an illustrative example, the base station 1400 may include the first device 104, the second device 106 of FIG. 1, the first device 134 of FIG. 2, or a combination thereof. In an illustrative example, the base station 1400 may operate according to one or more of the methods or systems described with reference to FIGS. 1-13.

The base station 1400 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 1400 of FIG. 14.

Various functions may be performed by one or more components of the base station 1400 (and/or in other components not shown), such as sending and receiving messages and data (e.g., audio data). In a particular example, the base station 1400 includes a processor 1406 (e.g., a CPU). The base station 1400 may include a transcoder 1410. The transcoder 1410 may include an audio CODEC 1408. For example, the transcoder 1410 may include one or more components (e.g., circuitry) configured to perform operations of the audio CODEC 1408. As another example, the transcoder 1410 may be configured to execute one or more computer-readable instructions to perform the operations of the audio CODEC 1408. Although the audio CODEC 1408 is illustrated as a component of the transcoder 1410, in other examples one or more components of the audio CODEC 1408 may be included in the processor 1406, another processing component, or a combination thereof. For example, a decoder 1438 (e.g., a vocoder decoder) may be included in a receiver data processor 1464. As another example, an encoder 1436 (e.g., a vocoder encoder) may be included in a transmission data processor 1482.

The transcoder 1410 may function to transcode messages and data between two or more networks. The transcoder 1410 may be configured to convert message and audio data from a first format (e.g., a digital format) to a second format. To illustrate, the decoder 1438 may decode encoded signals having a first format and the encoder 1436 may encode the decoded signals into encoded signals having a second format. Additionally, or alternatively, the transcoder 1410 may be configured to perform data rate adaptation. For example, the transcoder 1410 may down-convert a data rate or up-convert the data rate without changing a format the audio data. To illustrate, the transcoder 1410 may down-convert 64 kbit/s signals into 16 kbit/s signals.

The audio CODEC 1408 may include the encoder 1436 and the decoder 1438. The encoder 1436 may include the encoder 114 of FIG. 1, the encoder 214 of FIG. 2, or both. The decoder 1438 may include the decoder 118 of FIG. 1.

The base station 1400 may include a memory 1432. The memory 1432, such as a computer-readable storage device, may include instructions. The instructions may include one or more instructions that are executable by the processor 1406, the transcoder 1410, or a combination thereof, to perform one or more operations described with reference to the methods and systems of FIGS. 1-13. The base station 1400 may include multiple transmitters and receivers (e.g., transceivers), such as a first transceiver 1452 and a second transceiver 1454, coupled to an array of antennas. The array of antennas may include a first antenna 1442 and a second antenna 1444. The array of antennas may be configured to wirelessly communicate with one or more wireless devices, such as the device 1400 of FIG. 14. For example, the second antenna 1444 may receive a data stream 1414 (e.g., a bit stream) from a wireless device. The data stream 1414 may include messages, data (e.g., encoded speech data), or a combination thereof.

The base station 1400 may include a network connection 1460, such as backhaul connection. The network connection 1460 may be configured to communicate with a core network or one or more base stations of the wireless communication network. For example, the base station 1400 may receive a second data stream (e.g., messages or audio data) from a core network via the network connection 1460. The base station 1400 may process the second data stream to generate messages or audio data and provide the messages or the audio data to one or more wireless device via one or more antennas of the array of antennas or to another base station via the network connection 1460. In a particular implementation, the network connection 1460 may be a wide area network (WAN) connection, as an illustrative, non-limiting example. In some implementations, the core network may include or correspond to a Public Switched Telephone Network (PSTN), a packet backbone network, or both.

The base station 1400 may include a media gateway 1470 that is coupled to the network connection 1460 and the processor 1406. The media gateway 1470 may be configured to convert between media streams of different telecommunications technologies. For example, the media gateway 1470 may convert between different transmission protocols, different coding schemes, or both. To illustrate, the media gateway 1470 may convert from PCM signals to Real-Time Transport Protocol (RTP) signals, as an illustrative, non-limiting example. The media gateway 1470 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 1470 may include a transcode and may be configured to transcode data when codecs are incompatible. For example, the media gateway 1470 may transcode between an Adaptive Multi-Rate (AMR) codec and a G.711 codec, as an illustrative, non-limiting example. The media gateway 1470 may include a router and a plurality of physical interfaces. In some implementations, the media gateway 1470 may also include a controller (not shown). In a particular implementation, the media gateway controller may be external to the media gateway 1470, external to the base station 1400, or both. The media gateway controller may control and coordinate operations of multiple media gateways. The media gateway 1470 may receive control signals from the media gateway controller and may function to bridge between different transmission technologies and may add service to end-user capabilities and connections.

The base station 1400 may include a demodulator 1462 that is coupled to the transceivers 1452, 1454, the receiver data processor 1464, and the processor 1406, and the receiver data processor 1464 may be coupled to the processor 1406. The demodulator 1462 may be configured to demodulate modulated signals received from the transceivers 1452, 1454 and to provide demodulated data to the receiver data processor 1464. The receiver data processor 1464 may be configured to extract a message or audio data from the demodulated data and send the message or the audio data to the processor 1406.

The base station 1400 may include a transmission data processor 1482 and a transmission multiple input-multiple output (MIMO) processor 1484. The transmission data processor 1482 may be coupled to the processor 1406 and the transmission MIMO processor 1484. The transmission MIMO processor 1484 may be coupled to the transceivers 1452, 1454 and the processor 1406. In some implementations, the transmission MIMO processor 1484 may be coupled to the media gateway 1470. The transmission data processor 1482 may be configured to receive the messages or the audio data from the processor 1406 and to code the messages or the audio data based on a coding scheme, such as CDMA or orthogonal frequency-division multiplexing (OFDM), as illustrative, non-limiting examples. The transmission data processor 1482 may provide the coded data to the transmission MIMO processor 1484.

The coded data may be multiplexed with other data, such as pilot data, using CDMA or OFDM techniques to generate multiplexed data. The multiplexed data may then be modulated (i.e., symbol mapped) by the transmission data processor 1482 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 1406.

The transmission MIMO processor 1484 may be configured to receive the modulation symbols from the transmission data processor 1482 and may further process the modulation symbols and may perform beamforming on the data. For example, the transmission MIMO processor 1484 may apply beamforming weights to the modulation symbols. The beamforming weights may correspond to one or more antennas of the array of antennas from which the modulation symbols are transmitted.

During operation, the second antenna 1444 of the base station 1400 may receive a data stream 1414. The second transceiver 1454 may receive the data stream 1414 from the second antenna 1444 and may provide the data stream 1414 to the demodulator 1462. The demodulator 1462 may demodulate modulated signals of the data stream 1414 and provide demodulated data to the receiver data processor 1464. The receiver data processor 1464 may extract audio data from the demodulated data and provide the extracted audio data to the processor 1406.

The processor 1406 may provide the audio data to the transcoder 1410 for transcoding. The decoder 1438 of the transcoder 1410 may decode the audio data from a first format into decoded audio data and the encoder 1436 may encode the decoded audio data into a second format. In some implementations, the encoder 1436 may encode the audio data using a higher data rate (e.g., up-convert) or a lower data rate (e.g., down-convert) than received from the wireless device. In other implementations, the audio data may not be transcoded. Although transcoding (e.g., decoding and encoding) is illustrated as being performed by a transcoder 1410, the transcoding operations (e.g., decoding and encoding) may be performed by multiple components of the base station 1400. For example, decoding may be performed by the receiver data processor 1464 and encoding may be performed by the transmission data processor 1482. In other implementations, the processor 1406 may provide the audio data to the media gateway 1470 for conversion to another transmission protocol, coding scheme, or both. The media gateway 1470 may provide the converted data to another base station or core network via the network connection 1460.

The encoder 1436 may estimate a delay between the reference frame (e.g., the first frame 131) and the target frame (e.g., the second frame 133). The encoder 1436 may also estimate a temporal offset between the reference channel (e.g., the first audio signal 130) and the target channel (e.g., the second audio signal 132) based on the delay and based on historical delay data. The encoder 1436 may quantize and encode the temporal offset (or the final shift) value at a different resolution based on the CODEC sample rate to reduce (or minimize) the impact on the overall delay of the system. In one example implementation, the encoder may estimate and use the temporal offset with a higher resolution for multi-channel downmix purposes at the encoder, however, the encoder may quantize and transmit at a lower resolution for use at the decoder. The decoder 118 may generate the first output signal 126 and the second output signal 128 by decoding encoded signals based on the reference signal indicator 164, the non-causal shift value 162, the gain parameter 160, or a combination thereof. Encoded audio data generated at the encoder 1436, such as transcoded data, may be provided to the transmission data processor 1482 or the network connection 1460 via the processor 1406.

The transcoded audio data from the transcoder 1410 may be provided to the transmission data processor 1482 for coding according to a modulation scheme, such as OFDM, to generate the modulation symbols. The transmission data processor 1482 may provide the modulation symbols to the transmission MIMO processor 1484 for further processing and beamforming. The transmission MIMO processor 1484 may apply beamforming weights and may provide the modulation symbols to one or more antennas of the array of antennas, such as the first antenna 1442 via the first transceiver 1452. Thus, the base station 1400 may provide a transcoded data stream 1416, that corresponds to the data stream 1414 received from the wireless device, to another wireless device. The transcoded data stream 1416 may have a different encoding format, data rate, or both, than the data stream 1414. In other implementations, the transcoded data stream 1416 may be provided to the network connection 1460 for transmission to another base station or a core network.

The base station 1400 may therefore include a computer-readable storage device (e.g., the memory 1432) storing instructions that, when executed by a processor (e.g., the processor 1406 or the transcoder 1410), cause the processor to perform operations including estimating a delay between the reference frame and the target frame. The operations also include estimating a temporal offset between the reference channel and the target channel based on the delay and based on historical delay data.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a memory device, such as random access memory (RAM), magneto-resistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method for coding of multi-channel audio signals at an encoder of an electronic device, the method comprising:

estimating comparison values, at the encoder, each comparison value indicative of an amount of temporal mismatch between a first reference frame of a reference channel and a corresponding first target frame of a target channel;

smoothing, at the encoder, the comparison values to generate short-term smoothed comparison values;

smoothing, at the encoder, the comparison values to generate first long-term smoothed comparison values based on a smoothing parameter;

calculating, at the encoder, a cross-correlation value between the comparison values and the short-term smoothed comparison values;

comparing, at the encoder, the cross-correlation value with a threshold;

adjusting, at the encoder, the first long-term smoothed comparison values to generate second long-term smoothed comparison values, in response to determination that the cross-correlation value exceeds the threshold;

estimating, at the encoder, a tentative shift value based on the second long-term smoothed comparison values;

determining, at the encoder, a non-causal shift value based on the tentative shift value;

non-causally shifting, at the encoder, a particular target channel by the non-causal shift value to generate an adjusted particular target channel that is temporally aligned with a particular reference channel; and generating, at the encoder, at least one of a mid-band channel or a side-band channel based on the particular reference channel and the adjusted particular target channel.

2. The method of claim 1, wherein adjusting the first long-term smoothed comparison values comprises increasing values of a subset of the first long-term smoothed comparison values.

3. The method of claim 2, wherein increasing the values of the subset of the first long-term smoothed comparison values comprises increasing at least a value of a first index, wherein the first index corresponds to a non-causal shift value of a second target frame, the second target frame immediately precedes the first target frame.

4. The method of claim 3, wherein the subset of the first long-term smoothed comparison values includes a second index and a third index, wherein the second index is smaller than the first index by one and the third index is bigger than the first index by one.

5. The method of claim 1, wherein the short-term smoothed comparison values are further based on short-term smoothed comparison values of at least one previous frame.

6. The method of claim 5, wherein smoothing the comparison values to generate the short-term smoothed comparison values comprises finite impulse response (FIR) filtering the comparison values.

7. The method of claim 1, wherein the first long-term smoothed comparison values are further based on a weighted mixture of the comparison values and second long-term smoothed comparison values of at least one previous frame.

8. The method of claim 7, wherein smoothing the comparison values to generate the first long-term smoothed comparison values comprises infinite impulse response (IIR) filtering the comparison values.

9. The method of claim 1, wherein calculating the cross-correlation value comprises multiplying each value of the comparison values with each value of the short-term smoothed comparison values.

10. The method of claim 1, wherein the comparison values correspond to cross-correlation values of down-sampled reference channels and corresponding down-sampled target channels.

11. The method of claim 1, further comprising adapting, at the encoder, the smoothing parameter based on variation in the short-term smoothed comparison values relative to the second long-term smoothed comparison values.

12. The method of claim 1, wherein a value of the smoothing parameter is adjusted based on short-term energy indicator of input channels and long-term energy indicator of the input channels.

13. The method of claim 1, wherein the electronic device comprises a mobile device.

14. The method of claim 1, wherein the electronic device comprises a base station.

15. An apparatus for coding of multi-channel audio signals, comprising:

a first microphone configured to capture a first reference frame of a reference channel;

a second microphone configured to capture a corresponding first target frame of a target channel; and an encoder configured to:

estimate comparison values each comparison value indicative of an amount of temporal mismatch between the first reference frame of the reference channel and the first target frame of the target channel;

smooth the comparison values to generate short-term smoothed comparison values;

smooth the comparison values to generate first long-term smoothed comparison values based on a smoothing parameter;

calculate a cross-correlation value between the comparison values and the short-term smoothed comparison values;

compare the cross-correlation value with a threshold;

adjust the first long-term smoothed comparison values to generate second long-term smoothed comparison values, in response to determination that the cross-correlation value exceeds the threshold;

estimate a tentative shift value based on the second long-term smoothed comparison values;

determine a non-causal shift value based on the tentative shift value;

non-causally shift a particular target channel by the non-causal shift value to generate an adjusted particular target channel that is temporally aligned with a particular reference channel; and generate at least one of a mid-band channel or a side-band channel based on the particular reference channel and the adjusted particular target channel.

16. The apparatus of claim 15, wherein the encoder is configured to adjust the first long-term smoothed comparison values by increasing values of a subset of the first long-term smoothed comparison values.

17. The apparatus of claim 16, wherein the encoder is configured to adjust the first long-term smoothed comparison values by increasing at least a value of a first index, wherein the first index corresponds to a non-causal shift value of a second target frame, the second target frame immediately precedes the first target frame.

18. The apparatus of claim 17, wherein the subset of the first long-term smoothed comparison values includes a second index and a third index, wherein the second index is smaller than the first index by one and the third index is bigger than the first index by one.

19. The apparatus of claim 15, wherein the encoder is configured to smooth the comparison values to generate short-term smoothed comparison values by finite impulse response (FIR) filtering the comparison values.

20. The apparatus of claim 15, wherein the first long-term smoothed comparison values are further based on a weighted mixture of the comparison values and second long-term smoothed comparison values of at least one previous frame.

21. The apparatus of claim 20, wherein the encoder is configured to smooth the comparison values to generate long-term smoothed comparison values by infinite impulse response (IIR) filtering the comparison values.

22. The apparatus of claim 15, wherein the comparison values are cross-correlation values of down-sampled reference channels and corresponding down-sampled target channels.

23. The apparatus of claim 15, wherein the encoder is integrated into a mobile device.

24. The apparatus of claim 15, wherein the encoder is integrated into a base station.

25. A non-transitory computer-readable medium comprising instructions that, when executed by an encoder, cause the encoder to perform operations comprising:

estimating comparison values, each comparison value indicative of an amount of temporal mismatch between a first reference frame of a reference channel and a corresponding first target frame of a target channel;

smoothing the comparison values to generate short-term smoothed comparison values;

smoothing the comparison values to generate first long-term smoothed comparison values based on a smoothing parameter;

calculating a cross-correlation value between the comparison values and the short-term smoothed comparison values;

comparing the cross-correlation value with a threshold;

adjusting the first long-term smoothed comparison values to generate second long-term smoothed comparison values, in response to determination that the cross-correlation value exceeds the threshold;

estimating a tentative shift value based on the second long-term smoothed comparison values;

determining a non-causal shift value based on the tentative shift value;

non-causally shifting a particular target channel by the non-causal shift value to generate an adjusted particular target channel that is temporally aligned with a particular reference channel; and generating at least one of a mid-band channel or a side-band channel based on the particular reference channel and the adjusted particular target channel.

26. The non-transitory computer-readable medium of claim 25, wherein the operations further comprise adjusting the first long-term smoothed comparison values comprises increasing values of a subset of the first long-term smoothed comparison values.

27. The non-transitory computer-readable medium of claim 25, wherein increasing the values of the subset of the first long-term smoothed comparison values comprises increasing at least a value of a first index, wherein the first index corresponds to a non-causal shift value of a second target frame, the second target frame immediately precedes the first target frame.

28. The non-transitory computer-readable medium of claim 25, wherein calculating the cross-correlation value comprises multiplying each value of the comparison values with each value of the short-term smoothed comparison values.

29. An apparatus for coding of multi-channel audio signals, comprising:

means for estimating comparison values each comparison value indicative of an amount of temporal mismatch between a first reference frame of a reference channel and a corresponding first target frame of a target channel;

means for smoothing the comparison values to generate short-term smoothed comparison values;

means for smoothing the comparison values to generate first long-term smoothed comparison values based on a smoothing parameter;

means for calculating a cross-correlation value between the comparison values and the short-term smoothed comparison values;

means for comparing the cross-correlation value with a threshold;

means for adjusting the first long-term smoothed comparison values to generate second long-term smoothed comparison values, in response to determination that the cross-correlation value exceeds the threshold;

means for estimating a tentative shift value based on the second long-term smoothed comparison values;

means for determining a non-causal shift value based on the tentative shift value;

means for non-causally shifting a particular target channel by the non-causal shift value to generate an adjusted particular target channel that is temporally aligned with a particular reference channel; and means for generating at least one of a mid-band channel or a side-band channel based on the particular reference channel and the adjusted particular target channel.

30. The apparatus of claim 29, wherein the means for adjusting the first long-term smoothed comparison values comprises means for increasing values of a subset of the first long-term smoothed comparison values.

31. The apparatus of claim 29, wherein the means for increasing the values of the subset of the first long-term smoothed comparison values comprises means for increasing at least a value of a first index, wherein the first index corresponds to a non-causal shift value of a second target frame, the second target frame immediately precedes the first target frame.

32. The apparatus of claim 29, wherein the means for calculating the cross-correlation value comprises means for multiplying each value of the comparison values with each value of the short-term smoothed comparison values.

33. A method for coding of multi-channel audio signals at an encoder of an electronic device, the method comprising:

estimating comparison values, at the encoder, each comparison value indicative of an amount of temporal mismatch between a first reference frame of a reference channel and a corresponding first target frame of a target channel;

smoothing, at the encoder, the comparison values to generate first long-term smoothed comparison values based on a smoothing parameter;

calculating, at the encoder, a gain parameter between a second reference frame of the reference channel and a corresponding second target frame of the target channel, the gain parameter based on an energy of the second reference frame and an energy of the second target frame, wherein the second reference frame precedes the first reference frame and the second target frame precedes the first target frame;

comparing, at the encoder, the gain parameter with a first threshold;

in response to the comparison, adjusting, at the encoder, a first subset of the first long-term smoothed comparison values to generate second long-term smoothed comparison values;

estimating, at the encoder, a tentative shift value based on the second long-term smoothed comparison values;

determining, at the encoder, a non-causal shift value based on the tentative shift value;

non-causally shifting, at the encoder, a particular target channel by the non-causal shift value to generate an adjusted particular target channel that is temporally aligned with a particular reference channel; and generating, at the encoder, at least one of a mid-band channel or a side-band channel based on the particular reference channel and the adjusted particular target channel.

34. The method of claim 33, wherein adjusting the first subset of the first long-term smoothed comparison values comprise emphasizing a positive shift side of the first long-term smoothed comparison values in response to the comparison that the gain parameter is greater than the first threshold.

35. The method of claim 33, wherein adjusting the first subset of the first long-term smoothed comparison values comprise deemphasizing a negative shift side of the first long-term smoothed comparison values in response to the comparison that the gain parameter is greater than the first threshold.

36. The method of claim 33, wherein adjusting the first subset of the first long-term smoothed comparison values comprise emphasizing a negative shift side of the first long-term smoothed comparison values in response to the comparison that the gain parameter is less than the first threshold.

37. The method of claim 33, wherein adjusting the first subset of the first long-term smoothed comparison values comprise deemphasizing a positive shift side of the first long-term smoothed comparison values in response to the comparison that the gain parameter is greater than the first threshold.

38. An apparatus for coding of multi-channel audio signals, comprising:

a first microphone configured to capture a first reference frame of a reference channel;

a second microphone configured to capture a first target frame of a target channel; and an encoder configured to:

estimate comparison values, each comparison value indicative of an amount of temporal mismatch between the first reference frame of the reference channel and the corresponding first target frame of the target channel;

smooth the comparison values to generate first long-term smoothed comparison values based on a smoothing parameter;

calculate a gain parameter between a second reference frame of the reference channel and a corresponding second target frame of the target channel, the gain parameter based on an energy of the second reference frame and an energy of the second target frame, wherein the second reference frame precedes the first reference frame and the second target frame precedes the first target frame;

compare the gain parameter with a first threshold;

in response to the comparison, adjust a first subset of the first long-term smoothed comparison values to generate second long-term smoothed comparison values;

estimate a tentative shift value based on the second long-term smoothed comparison values;

determine a non-causal shift value based on the tentative shift value;

non-causally shift a particular target channel by the non-causal shift value to generate an adjusted particular target channel that is temporally aligned with a particular reference channel; and generate at least one of a mid-band channel or a side-band channel based on the particular reference channel and the adjusted particular target channel.

39. The apparatus of claim 38, wherein the encoder is configured to adjust the first subset of the first long-term smoothed comparison values by emphasizing a positive shift side of the first long-term smoothed comparison values in response to the comparison that the gain parameter is greater than the first threshold.

40. The apparatus of claim 38, wherein the encoder is configured to adjust the first subset of the first long-term smoothed comparison values by deemphasizing a negative shift side of the first long-term smoothed comparison values in response to the comparison that the gain parameter is greater than the first threshold.

41. The apparatus of claim 38, wherein the encoder is configured to adjust the first subset of the first long-term smoothed comparison values by emphasizing a negative shift side of the first long-term smoothed comparison values in response to the comparison that the gain parameter is less than the first threshold.

42. The apparatus of claim 38, wherein the encoder is configured to adjust the first subset of the first long-term smoothed comparison values by deemphasizing a positive shift side of the first long-term smoothed comparison values in response to the comparison that the gain parameter is greater than the first threshold.

43. A non-transitory computer-readable medium comprising instructions that, when executed by an encoder, cause the encoder to perform operations comprising:

estimating comparison values each comparison value indicative of an amount of temporal mismatch between a first reference frame of a reference channel and a corresponding first target frame of a target channel;

smoothing the comparison values to generate first long-term smoothed comparison values based on a smoothing parameter;

calculating a gain parameter between a second reference frame of the reference channel and a corresponding second target frame of the target channel, the gain parameter based on an energy of the second reference frame and an energy of the second target frame, wherein the second reference frame precedes the first reference frame and the second target frame precedes the first target frame;

comparing the gain parameter with a first threshold;

in response to the comparison, adjusting, at the encoder, a first subset of the first long-term smoothed comparison values to generate second long-term smoothed comparison values;

estimating a tentative shift value based on the second long-term smoothed comparison values;

determining a non-causal shift value based on the tentative shift value;

non-causally shifting a particular target channel by the non-causal shift value to generate an adjusted particular target channel that is temporally aligned with a particular reference channel; and generating at least one of a mid-band channel or a side-band channel based on the particular reference channel and the adjusted particular target channel.

44. The non-transitory computer-readable medium of claim 43, wherein adjusting the first subset of the first long-term smoothed comparison values comprise emphasizing a positive shift side of the first long-term smoothed comparison values in response to the comparison that the gain parameter is greater than the first threshold.

45. The non-transitory computer-readable medium of claim 43, wherein adjusting the first subset of the first long-term smoothed comparison values comprise deemphasizing a negative shift side of the first long-term smoothed comparison values in response to the comparison that the gain parameter is greater than the first threshold.

46. The non-transitory computer-readable medium of claim 43, wherein adjusting the first subset of the first long-term smoothed comparison values comprise emphasizing a negative shift side of the first long-term smoothed comparison values in response to the comparison that the gain parameter is less than the first threshold.

47. The non-transitory computer-readable medium of claim 43, wherein adjusting the first subset of the first long-term smoothed comparison values comprise deemphasizing a positive shift side of the first long-term smoothed comparison values in response to the comparison that the gain parameter is greater than the first threshold.

48. An apparatus for coding of multi-channel audio signals at an encoder of an electronic device, the method comprising:

means for estimating comparison values, at the encoder, each comparison value indicative of an amount of temporal mismatch between a first reference frame of a reference channel and a corresponding first target frame of a target channel;

means for smoothing, at the encoder, the comparison values to generate first long-term smoothed comparison values based on a smoothing parameter;

means for calculating, at the encoder, a gain parameter between a second reference frame of the reference channel and a corresponding second target frame of the target channel, the gain parameter based on an energy of the second reference frame and an energy of the second target frame, wherein the second reference frame precedes the first reference frame and the second target frame precedes the first target frame;

means for comparing the gain parameter with a first threshold;

in response to the comparison, means for adjusting, at the encoder, a first subset of the first long-term smoothed comparison values to generate second long-term smoothed comparison values;

means for estimating, at the encoder, a tentative shift value based on the second long-term smoothed comparison values;

means for determining, at the encoder, a non-causal shift value based on the tentative shift value;

means for non-causally shifting, at the encoder, a particular target channel by the non-causal shift value to generate an adjusted particular target channel that is temporally aligned with a particular reference channel; and means for generating, at the encoder, at least one of a mid-band channel or a side-band channel based on the particular reference channel and the adjusted particular target channel.

49. The apparatus of claim 48, wherein means for adjusting the first subset of the first long-term smoothed comparison values comprises means for emphasizing a positive shift side of the first long-term smoothed comparison values in response to the comparison that the gain parameter is greater than the first threshold.

50. The apparatus of claim 48, wherein means for adjusting the first subset of the first long-term smoothed comparison values comprises means for deemphasizing a negative shift side of the first long-term smoothed comparison values in response to the comparison that the gain parameter is greater than the first threshold.

51. The apparatus of claim 48, wherein means for adjusting the first subset of the first long-term smoothed comparison values comprises means for emphasizing a negative shift side of the first long-term smoothed comparison values in response to the comparison that the gain parameter is less than the first threshold.

52. The apparatus of claim 48, wherein means for adjusting the first subset of the first long-term smoothed comparison values comprises means for deemphasizing a positive shift side of the first long-term smoothed comparison values in response to the comparison that the gain parameter is greater than the first threshold.

* * * * *